(12) United States Patent
Zaloom

(10) Patent No.: US 9,483,083 B1
(45) Date of Patent: Nov. 1, 2016

(54) ROTATION LOCK MECHANISM FOR LOAD BEARING HINGES

(71) Applicant: Joseph A. Zaloom, Arlington, VA (US)

(72) Inventor: Joseph A. Zaloom, Arlington, VA (US)

( * ) Notice: Subject to any disclaimer, the term of this patent is extended or adjusted under 35 U.S.C. 154(b) by 40 days.

(21) Appl. No.: 14/488,054

(22) Filed: Sep. 16, 2014

Related U.S. Application Data

(63) Continuation-in-part of application No. 14/255,711, filed on Apr. 17, 2014.

(60) Provisional application No. 61/878,491, filed on Sep. 16, 2013, provisional application No. 61/906,878, filed on Nov. 20, 2013.

(51) Int. Cl.
 E05D 11/10 (2006.01)
 G06F 1/16 (2006.01)
 E05D 11/06 (2006.01)

(52) U.S. Cl.
 CPC ............ G06F 1/1679 (2013.01); E05D 11/06 (2013.01); G06F 1/1681 (2013.01)

(58) Field of Classification Search
 CPC ............... E05D 11/06; E05D 11/1078; Y10T 16/540254; Y10T 16/540255; Y10T 16/540247; Y10T 16/54025; Y10T 16/540253; Y10T 16/54024; Y10T 16/5402; Y10T 16/54; Y10T 16/540256; Y10T 16/540257; Y10T 16/54026; Y10T 16/54095; Y10T 16/5275
 See application file for complete search history.

(56) References Cited

U.S. PATENT DOCUMENTS

| 1,166,702 | A | * | 1/1916 | Mardon et al. | ..... E05D 11/1078 16/329 |
| 2,101,500 | A | | 12/1937 | Jagus | |
| 3,744,085 | A | * | 7/1973 | Griego | ................ E05D 11/1007 16/325 |
| 4,436,271 | A | | 3/1984 | Manso | |
| 5,020,763 | A | | 6/1991 | Hegarty | |
| 5,058,848 | A | | 10/1991 | Ferraro | |
| 5,060,904 | A | | 10/1991 | Hegarty | |
| 5,074,164 | A | * | 12/1991 | Sheu | ................... E05D 11/1007 16/349 |
| 5,100,098 | A | | 3/1992 | Hawkins | |
| 5,168,601 | A | * | 12/1992 | Liu | .......................... B62B 9/20 16/329 |
| 5,933,996 | A | | 8/1999 | Chang | |
| 6,367,760 | B1 | | 4/2002 | Pagano | |
| 6,983,514 | B2 | | 1/2006 | Lu et al. | |
| 7,083,155 | B1 | | 8/2006 | Smartt | |
| 7,188,818 | B2 | | 3/2007 | Chang | |
| 7,546,996 | B2 | | 6/2009 | Somji | |
| 7,568,915 | B1 | | 8/2009 | Lavoie | |
| 7,581,290 | B2 | | 9/2009 | Chang | |
| 7,591,604 | B2 | * | 9/2009 | Roberts | ..................... B25F 5/02 16/326 |
| 7,611,117 | B1 | | 11/2009 | Lang, Jr. | |
| 7,712,719 | B2 | | 5/2010 | Derry et al. | |
| 7,770,862 | B2 | | 8/2010 | Chen | |
| 7,836,623 | B2 | | 11/2010 | Wang et al. | |
| 8,038,116 | B2 | | 10/2011 | Lee et al. | |

(Continued)

OTHER PUBLICATIONS

"Computer Components & Imaging Supplies", Crimson Imaging Supplies, Mar. 15, 2013, two pages.

(Continued)

Primary Examiner — Victor Batson
Assistant Examiner — Matthew Sullivan
(74) Attorney, Agent, or Firm — Nixon & Vanderhye P.C.

(57) ABSTRACT

For information display devices and other uses, a mechanism for unlocking and locking the rotation of a load-bearing hinge at multiple specific angles with the press and release of a push button—with an option for a default angular position.

8 Claims, 38 Drawing Sheets

(56) References Cited

U.S. PATENT DOCUMENTS

| | | | |
|---|---|---|---|
| 8,118,274 B2 | 2/2012 | McClure et al. | |
| D672,783 S | 12/2012 | Robinson | |
| 8,382,059 B2 | 2/2013 | LeGette et al. | |
| 8,387,930 B2 | 3/2013 | Drew et al. | |
| 8,661,618 B2* | 3/2014 | Jablonski | E05D 11/1007 |
| | | | 16/320 |
| 8,833,716 B2 | 9/2014 | Funk et al. | |
| 2004/0007649 A1 | 1/2004 | Vettraino | |
| 2005/0155183 A1 | 7/2005 | Lu et al. | |
| 2006/0084585 A1 | 4/2006 | Lin | |
| 2006/0137491 A1* | 6/2006 | Chen | B25B 13/461 |
| | | | 81/58 |
| 2006/0175484 A1 | 8/2006 | Wood, III et al. | |
| 2008/0156836 A1 | 7/2008 | Wadsworth et al. | |
| 2011/0094058 A1* | 4/2011 | Van Gennep | E05D 11/1007 |
| | | | 16/327 |
| 2012/0074272 A1 | 3/2012 | Hull | |
| 2012/0111881 A1 | 5/2012 | Gaddis, II et al. | |
| 2012/0126088 A1 | 5/2012 | Whittaker et al. | |
| 2012/0326003 A1 | 12/2012 | Solow et al. | |
| 2013/0092805 A1 | 4/2013 | Funk et al. | |
| 2013/0092811 A1 | 4/2013 | Funk et al. | |
| 2013/0233984 A1 | 9/2013 | Huang | |
| 2013/0256478 A1 | 10/2013 | Reda et al. | |
| 2013/0277520 A1 | 10/2013 | Funk et al. | |
| 2014/0054426 A1 | 2/2014 | Burns | |
| 2014/0063750 A1* | 3/2014 | Mau | G06F 1/1601 |
| | | | 361/728 |
| 2014/0116230 A1 | 5/2014 | Nakata et al. | |
| 2014/0259532 A1* | 9/2014 | Millard | E05D 11/1028 |
| | | | 16/326 |
| 2014/0328020 A1 | 11/2014 | Galant | |
| 2014/0346311 A1 | 11/2014 | Derman | |

OTHER PUBLICATIONS

"Ipad/Tablet Holding Products—Galaxy Tab Stand, Ipad Leg Strap, Nook Holder @ Hand e Holder", www.handholder.com, Mar. 15, 2013, four pages.

"HandyShell for iPad, iPad Cases & Covers/SpeckProducts", Mar. 15, 2013, two pages.

Detachable Metal Stand for iPad, Cell Phone, Smartphone, Tablet Accessories/iKross, Mar. 15, 2013, two pages.

"Life-Phorm All-in-One Positioning Device for iPad 3, iPad 4, Tablets, Smartphones and Cameras (000LIF)", Amazon.com: Life-Phorm All-in-One Positioning Device for iPad 3, iPad 4, Tablets, Smartphones and Cameras (000LIF): Computers & Accessories, Apr. 18, 2013, four pages.

"Stabile Coil PRO—Flexible Gooseneck Coil Based Pivoting iPad Stand—iPad 4g, 3g, iPad 2 and 1g", Stabile Coil PRO Flexible Gooseneck Coil Pivoting iPad 4g, 3g, iPad 2 and iPad Stand Holder, Apr. 18, 2013, four pages.

"Buzz / ZeroChromaZeroChroma", Mar. 15, 2013, twelve pages.

* cited by examiner

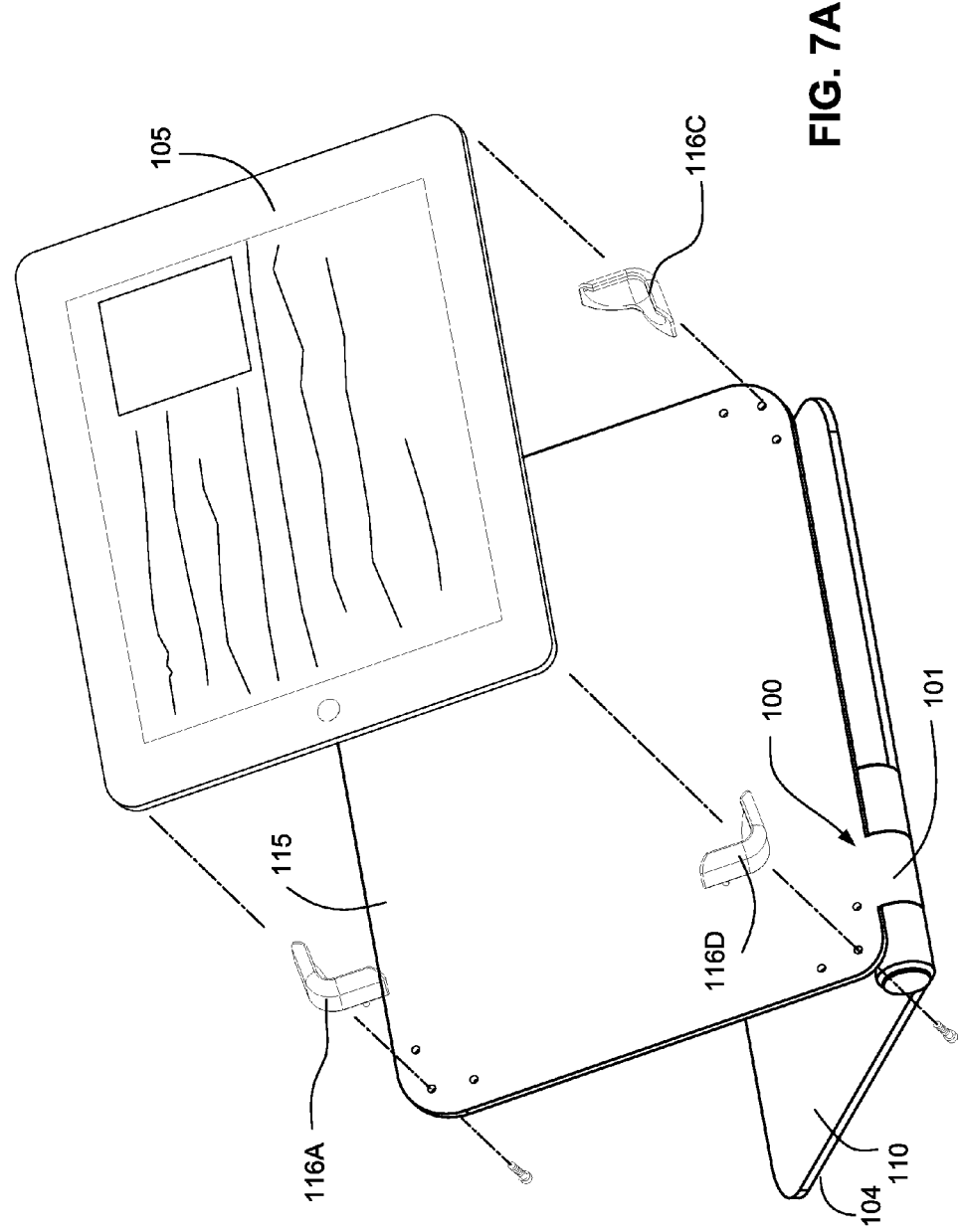

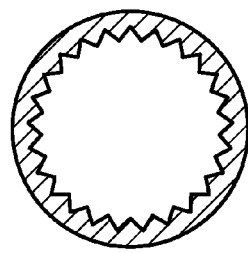 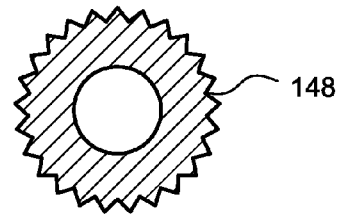
FIG. 11A  FIG. 11B
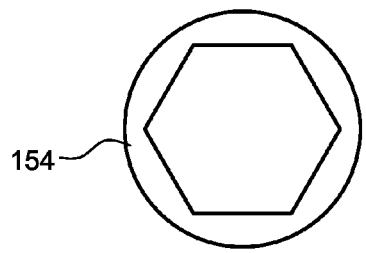 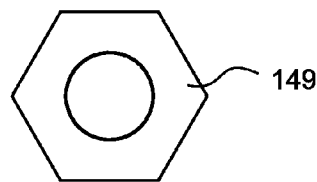
FIG. 12A  FIG. 12B
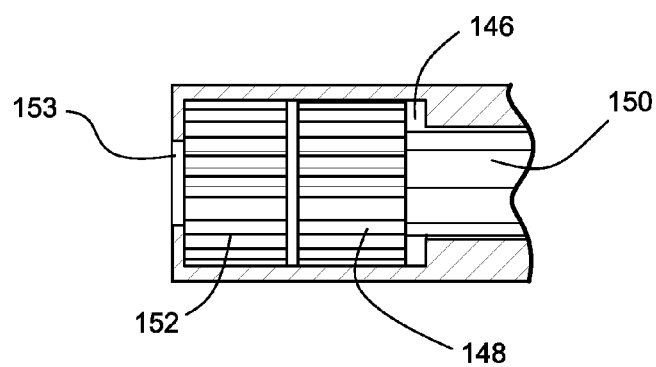
FIG. 13A
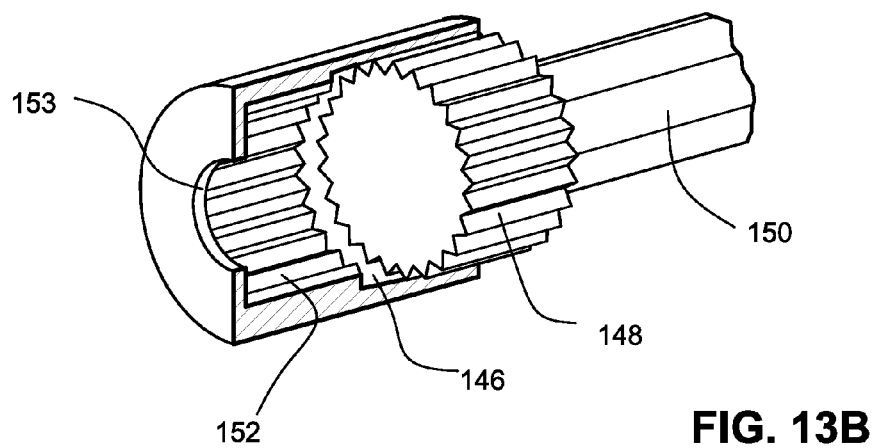
FIG. 13B

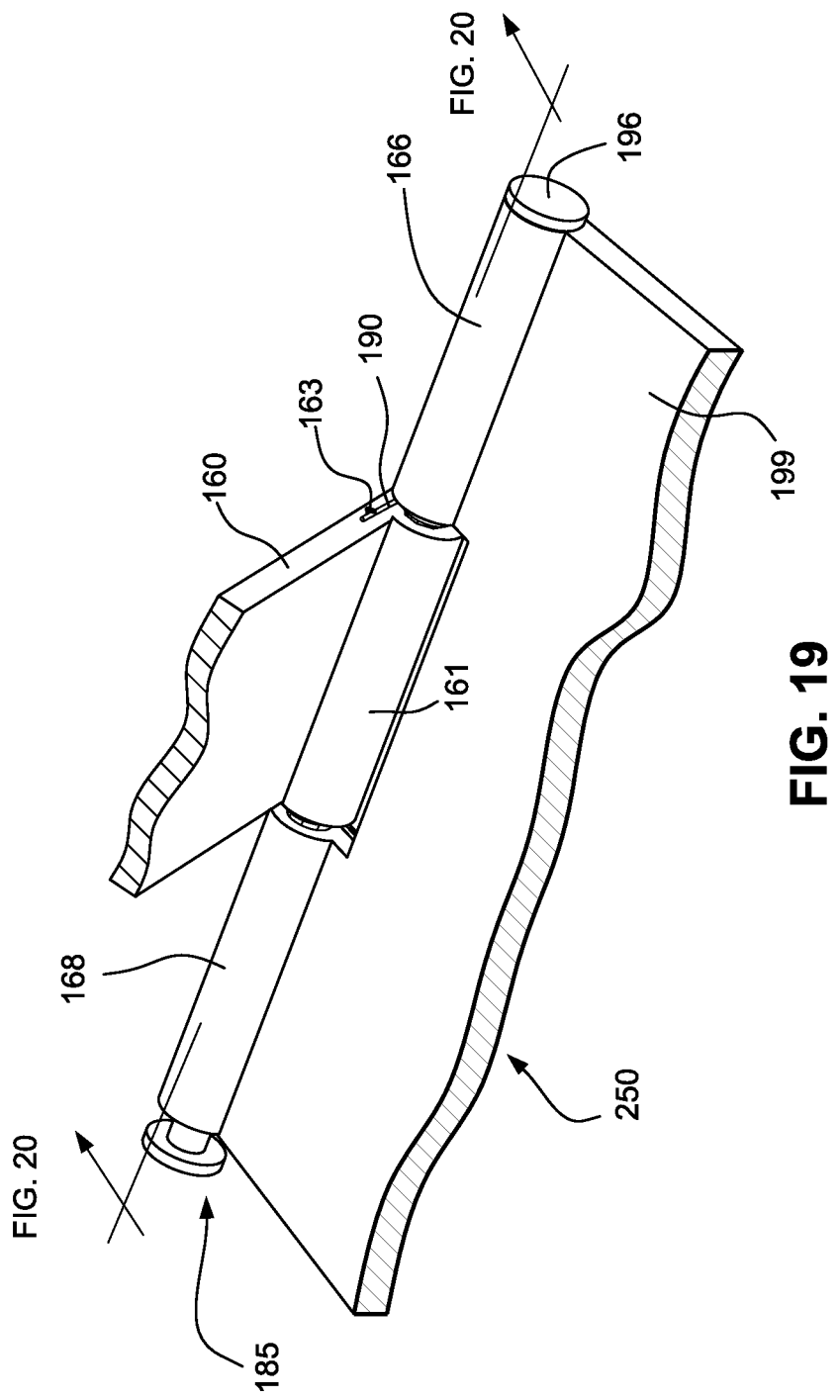

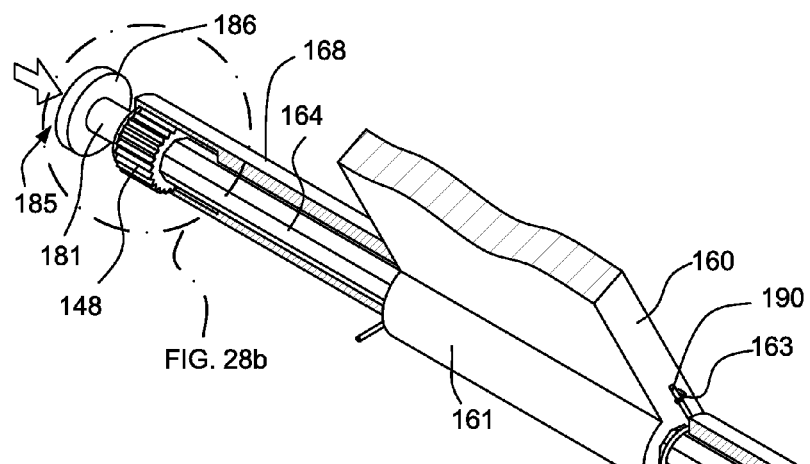
FIG. 28A
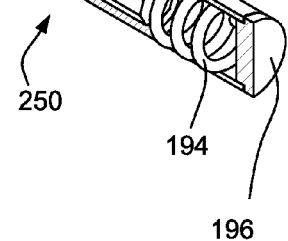
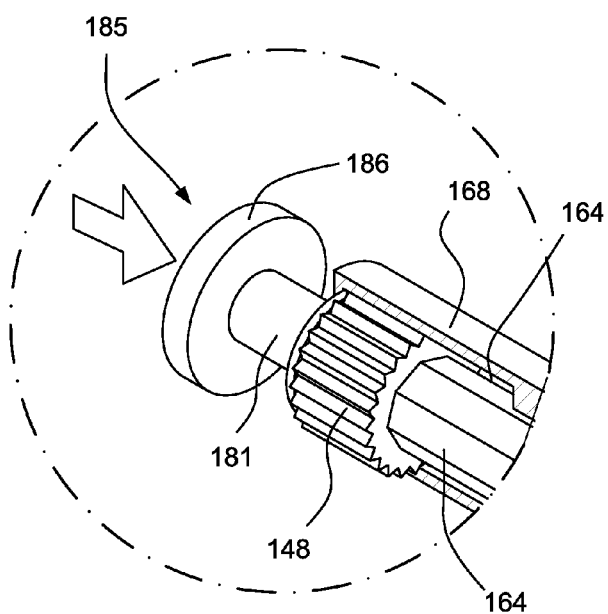
FIG. 28B
(Push Button In)

(Push Button In)

(Push Button In)

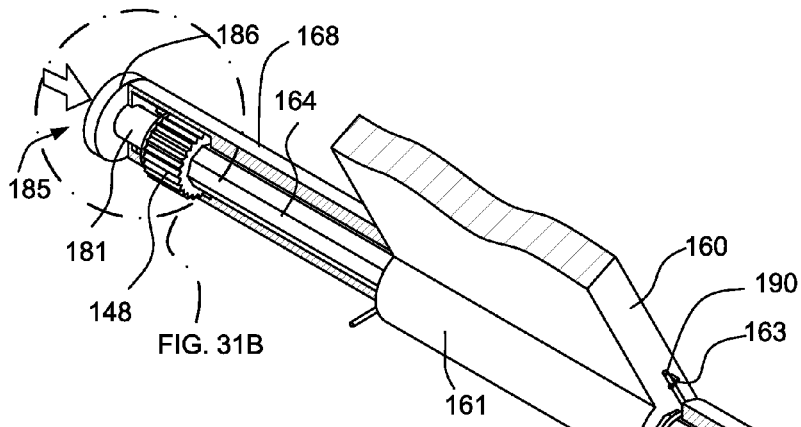
FIG. 31A
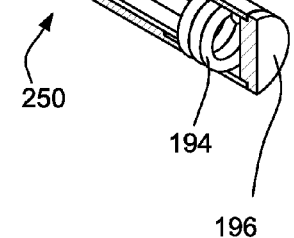
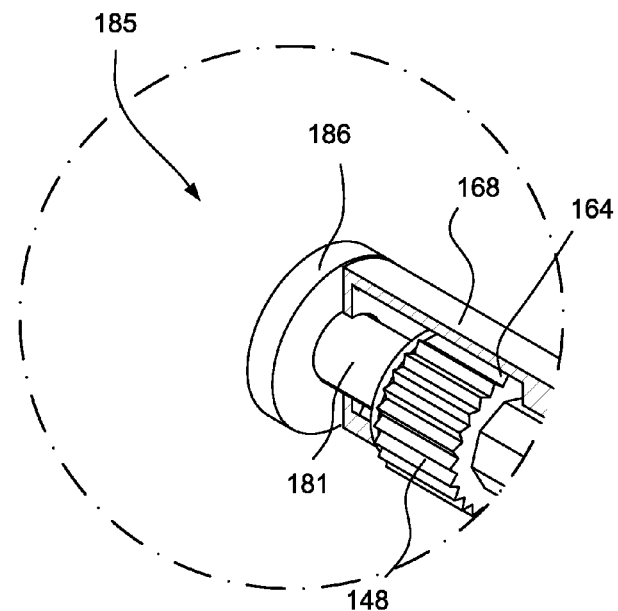
FIG. 31B
(Push Button In)

(Rotate)

(Rotate More)

(Rotate More)

(Rotate)

(Release Button)

(Release Button)

(Release Button)

(Release Button)

ROTATION LOCK MECHANISM FOR LOAD BEARING HINGES

CROSS-REFERENCE TO RELATED APPLICATIONS

This application is a continuation-in-part (CIP) of U.S. patent application Ser. No. 14/255,711, filed Apr. 17, 2014, and claims the benefit of U.S. Provisional Application 61/878,491 filed Sep. 16, 2013, and U.S. Provisional Application 61/906,878 filed Nov. 20, 2013, all of which applications are incorporated by reference in their entireties.

FIELD

The technology herein relates to personal information display devices among other applications, and more particularly to mechanisms for unlocking and locking the rotation of a load-bearing hinge at multiple specific angles with the manipulation (e.g., press or pull and release) of a button, or other control—with an option for a default angular position.

BACKGROUND

Since the introduction of the Apple iPad in April 2010, the number of computing devices known as computer tablets, or "tablets" has vastly increased. These devices typically consist of a touch screen that fronts a highly sophisticated, versatile, thin, and lightweight computer.

In some computing environments, for example, the display/tablet may have to be positioned to various angles and orientations with respect to the base (a resting surface) in order to, for example, eliminate glare or to enter data via a virtual, on-screen, keyboard. Furthermore, with the advent of the Samsung Galaxy Note 10.1 tablet in early 2012 and the Microsoft Surface Pro tablet in early 2013—both of which incorporate a stylus—the display may not only need to be positioned to various angles and orientations with respect to the base, but it may also need to support the load and the pressure of a human hand pressing a stylus or finger against the display surface of the tablet at multiple viewing angles, both for ergonomic reasons and to eliminate distracting reflections or glare.

The multitude of offerings from several manufacturers of tablets and tablet accessories reveals that the great majority of current tablet stands, folios, and covers provide either fixed or limited adjustability; typically resulting in either one or two display angles (with respect to a resting surface or base).

A company that currently offers a display stand or a tablet accessory with more than two display angles is Zero-Chroma, LLC (http://www.zerochroma.com) through their "Theater-Stand" smart cover for the iPhone, iPad, and iPod Touch (see US patent application numbers US20100072334, US20110031287, US20130134291). While the Zero-Chroma, LLC designs provide multiple viewing angles that can effectively eliminate glare and provide an ergonomic viewing experience, they only provide for a single load bearing viewing angle that can support hand-writing with a stylus without potentially sliding the display during hand-writing.

SUMMARY OF NON-LIMITING EXAMPLES

A need exists for a simple, intuitive, load bearing, rotation lock mechanism that would enable users to not only prop practically any computer tablet or display device at any desired angle, but to also provide the necessary support to withstand the load and the pressure of hand writing at any desired display angle. The lock mechanism could be used with keyboards, telephones (including cell phones and smart phones), and/or book stands and tablets (such as drawing and writing tablets) These devices and others use pivoting stands to adjust the angular position of the device with respect to a surface on which the device is seated. The non-limiting example rotation locking mechanism that has been conceived and is disclosed here provides an easy to operate, sturdy, inconspicuous and inexpensive rotational locking hinge to adjust the angular position between a device and its pivoting stand.

One example non-limiting embodiment of a rotation lock mechanism comprises a hinge pin which may consist of a shaft with a multi-sided cross section, or a toothed cylinder, which may be fastened to a notched, grooved, pinned, multi-sided, or multi-toothed disk, cylinder, or gear. The diameter of the fastened notched, grooved, pinned, multi-sided, or multi-toothed disk, cylinder, or gear may be smaller, equal to, or larger than the diameter of the multi-sided shaft or toothed cylinder. The shaft's cross sectional shape keys into and engages a middle cylinder of the hinge. The hinge may comprise more than one rotating plate between the stationary plates. As the shaft rotates, the hinge plate that is connected to the middle cylinder that is engaged to the shaft rotates. Inside one side-cylinder of the hinge is a spring that thrusts the shaft of the pin towards a stationary disk, cylinder, or gear at the edge of the opposing side-cylinder.

If the hinge pin terminates in or is fastened to a notched, grooved, pinned, multi-sided, or multi toothed disk or cylinder, then the stationary disk or cylinder can be made up of diametrically inverse grooves, notches, holes, edges, or teeth in such a way that when the two disks or cylinders—one of which may simply consist of or comprise the ending of the multi-sided or toothed shaft—come in contact with each other, they interlock and prevent the shaft and its engaged hinge plate from moving or turning one relative to the other.

If on the other hand, the hinge pin terminates in or is fastened to a gear (typically a spur gear), or a multi-sided cylinder (shaped like a hex or Allen wrench), then instead of being pushed into an opposing disk, the hinge pin would be inserted into an internal gear or a multi-sided cylindrical socket, or aperture, that is the inverse of the inserted spur gear or multi-sided cylinder in such a way that when the two gears or multi-sided cylinders come in contact with one another, they interlock and prevent the shaft and its engaged hinge plate from moving or turning one relative to the other.

In another non-limiting example, the hinge is allowed to pivot around its axis through use of a push-button located right outside of the side-cylinder opposite to the one containing the spring. As long as the push-button is pressed, the interlocked inverse disks, e.g., cylinders or gears, are disengaged from one another, and the shaft and its engaged hinge plate are free to rotate. Once the push-button is released, the opposing spring pushes the shaft and its engaged disk, e.g., cylinder or gear, back into the interlocked position described above, freezing the rotation of the shaft and its associated hinge plate in place.

In another non-limiting example, the hinge is allowed to pivot around its axis through the use of a pull-button located right outside of the side-cylinder containing the spring. As long as the pull-button is pulled, the interlocked inverse disks, e.g., cylinders or gears, are disengaged from one another, and the shaft and its associated engaged hinge plate are free to rotate. Once the pull-button is released, the spring pushes the shaft and its associated engaged disk, e.g., cylinder or gear, back into the interlocked position described above, freezing the rotation of the shaft and its associated hinge plate in place.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 7A and 7B are perspective views of a tablet computing device and associated hinged tablet stand including a tablet display panel connected by a hinge to a support panel, wherein a rotating lock mechanism associated with the hinge holds the tablet computing device at a selectable angular orientation with respect to the support panel.

FIGS. 11 A and 11B show in cross section an internal chamber (FIG. 11A) to house a disc with teeth (FIG. 11B).

FIG. 12 A and 12B show in cross section another example of an internal chamber (FIG. 12A) to house a disc with teeth (FIG. 12B).

FIGS. 13 A and 13 B show in cross section (FIG. 13A) and in partial cross section (FIG. 13B) a chamber housing a disc such as shown in FIGS. 11A and 11B, wherein the disc is in a second receptacle of the chamber.

FIG. 19 is a partial cross-sectional and three-dimensional (perspective) view of an example non-limiting rotation lock mechanism in a default "locked" position.

FIG. 20B is a cross-sectional view of an example non-limiting rotation lock mechanism in the "unlocked" position after the button had been pushed in.

FIG. 21B shows a cross-sectional view of the example non-limiting rotation lock mechanism with the locking mechanism located at an opposing end of one of the cylinders of the hinge in the "unlocked" position after the button has been pushed in.

FIGS. 28A-39A and 28B-39B together are a sequence of drawings that when displayed one after another provide a flip chart animation showing how the example non-limiting rotation lock mechanism can be unlocked, rotated and relocked.

DETAILED DESCRIPTION

Embodiments are directed to a non-limiting rotation lock mechanism for supporting and adjusting a display. The following figures illustrate the mechanics of an example non-limiting referenced load bearing rotation lock mechanism and demonstrate exemplary embodiments of the mechanism in action. The displayed embodiments are shown for exemplary purposes; the various parts shown in the provided illustrations, such as gears, shafts, hinges, openings, springs, buttons, and plates can have various shapes and sizes to fit the desired form and function of the devise in which they are integrated.

Example Non-Limiting Applications

Figure 1:
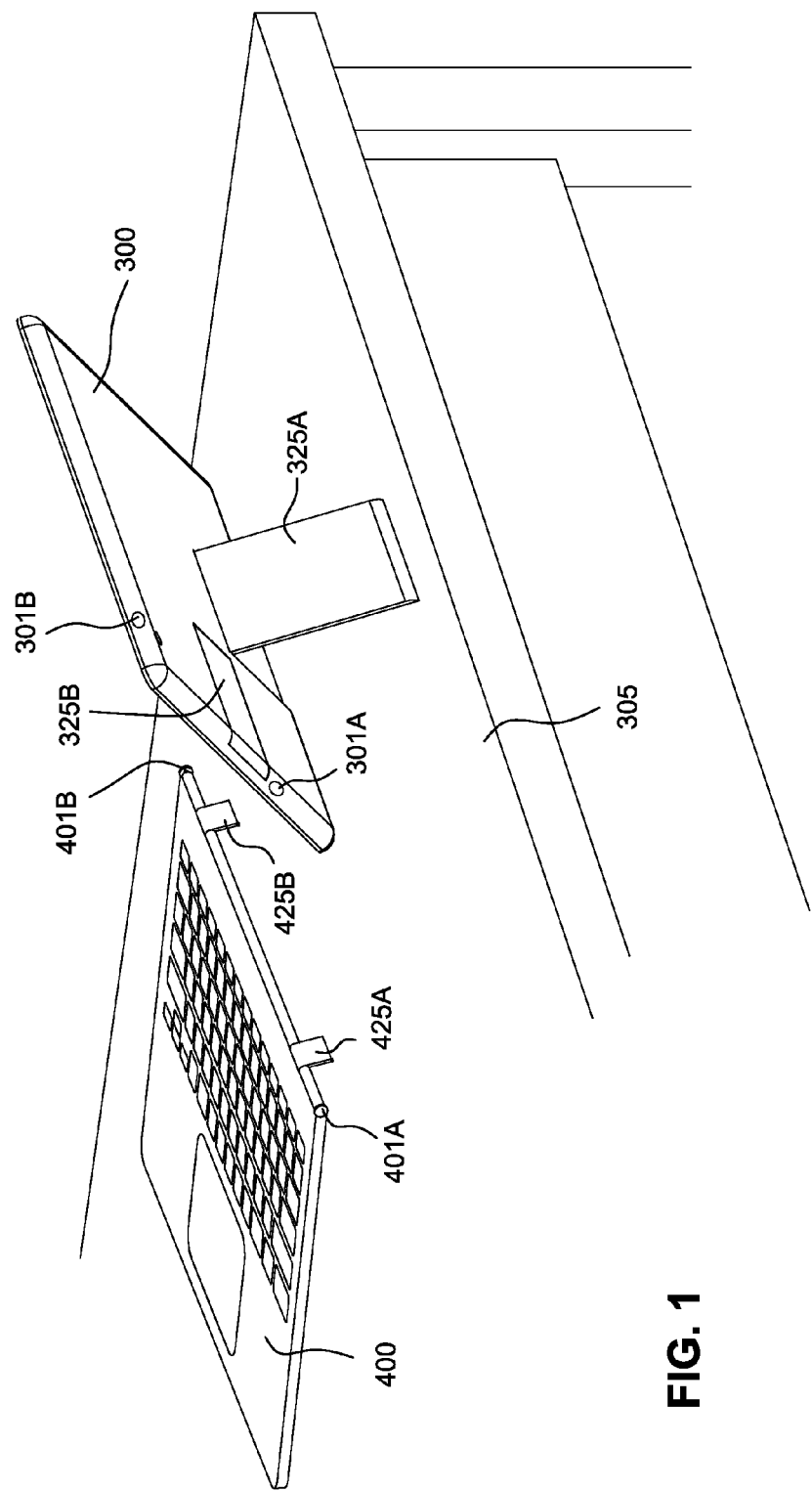
FIG. 1 is an elevated perspective view of a personal computing device having a keyboard and a display each including a hinged support panel(s) with a rotating lock mechanism to allow adjustment of the angles of inclination of the keyboard and display.

FIG. 1 illustrates an elevated perspective view of a personal computing device resting against a fixed surface 305 having a display 300 and a keyboard 400. The display 300 includes two built-in hinged support panels 325A and 325B that can be swung out by depressing two built-in buttons 301A and 301B located at the edge of two integrated rotating lock mechanisms to allow the adjustment of the angles of inclination of the display panel.

The keyboard 400 includes two built-in hinged support panels 425A and 425B that can be swung out by depressing two built-in buttons 401A and 401B located at the edge of two integrated rotating lock mechanisms to allow the adjustment of the angles of inclination of the keyboard.

Figure 2A:
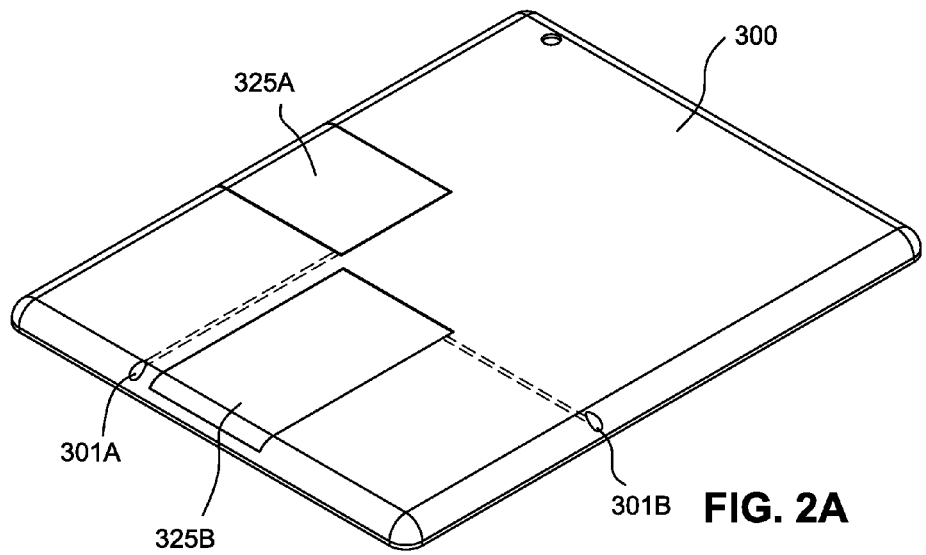
FIGS. 2A and 2B are elevated perspective views of a tablet computing device including a hinged tablet stand(s) with a load bearing rotation lock mechanism which allows the stand to be seated in the back of the tablet, as shown in FIG. 2A, and to swing out from the back when a button is pressed, as shown in FIG. 2B.
Figure 2B:
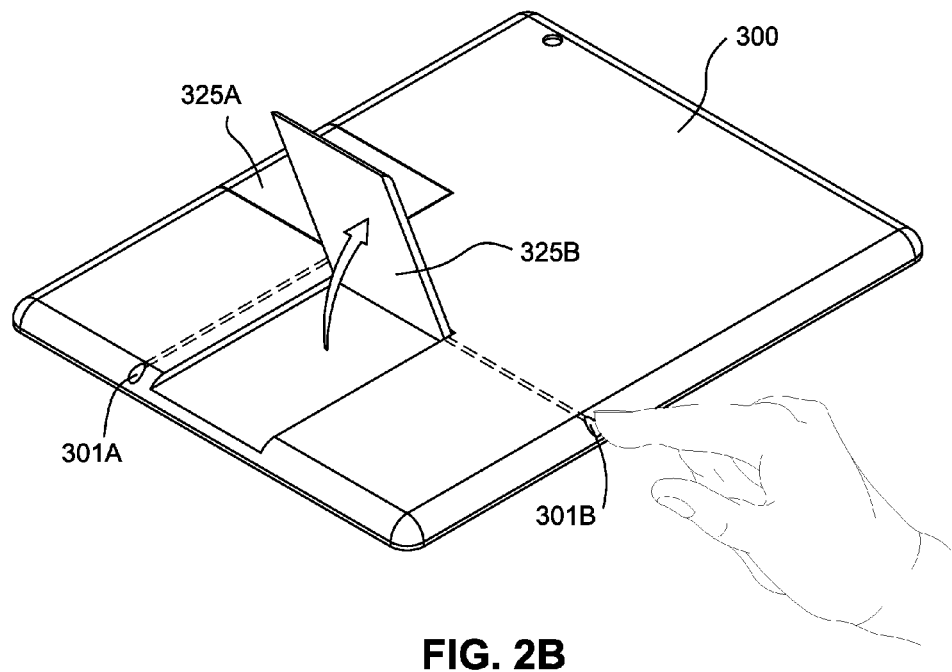

FIGS. 2A and 2B illustrate elevated perspective views of a tablet computing device 300 including hinged tablet stands 325A and 325B, each attached to a load bearing rotation lock mechanism ending with buttons 301A and 301B. The built-in rotating lock mechanisms allow the stands to be seated in the back of the tablet, as shown in FIG. 2A, and to swing out from the back of the tablet when a button 301A or 301B is pressed, as shown in FIG. 2B.

Figure 3:
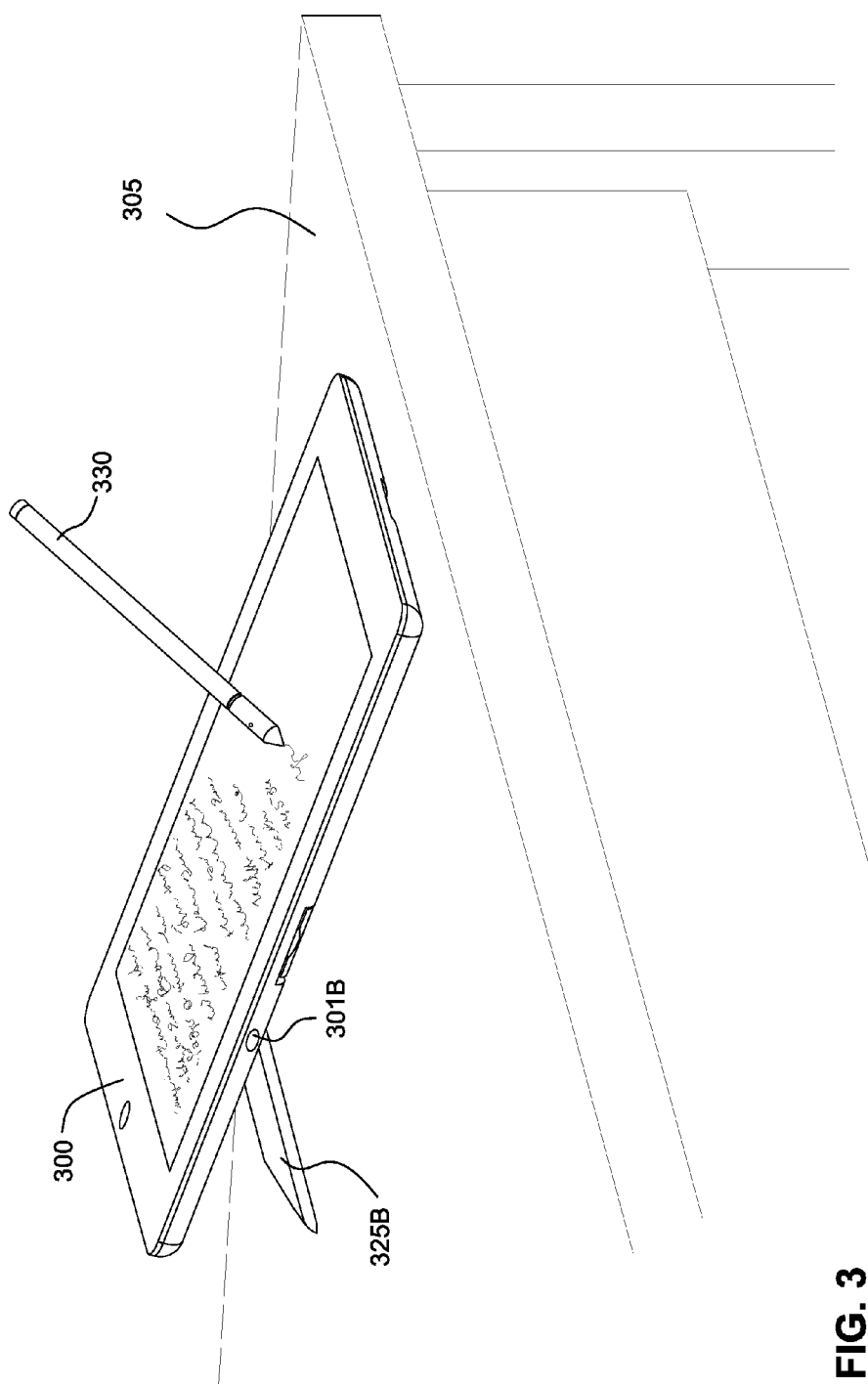
FIGS. 3 and 4 are perspective views of a tablet computing device sitting on a table and being inclined at an angle determined by a rotating lock mechanism and a hinged support panel.
Figure 4:
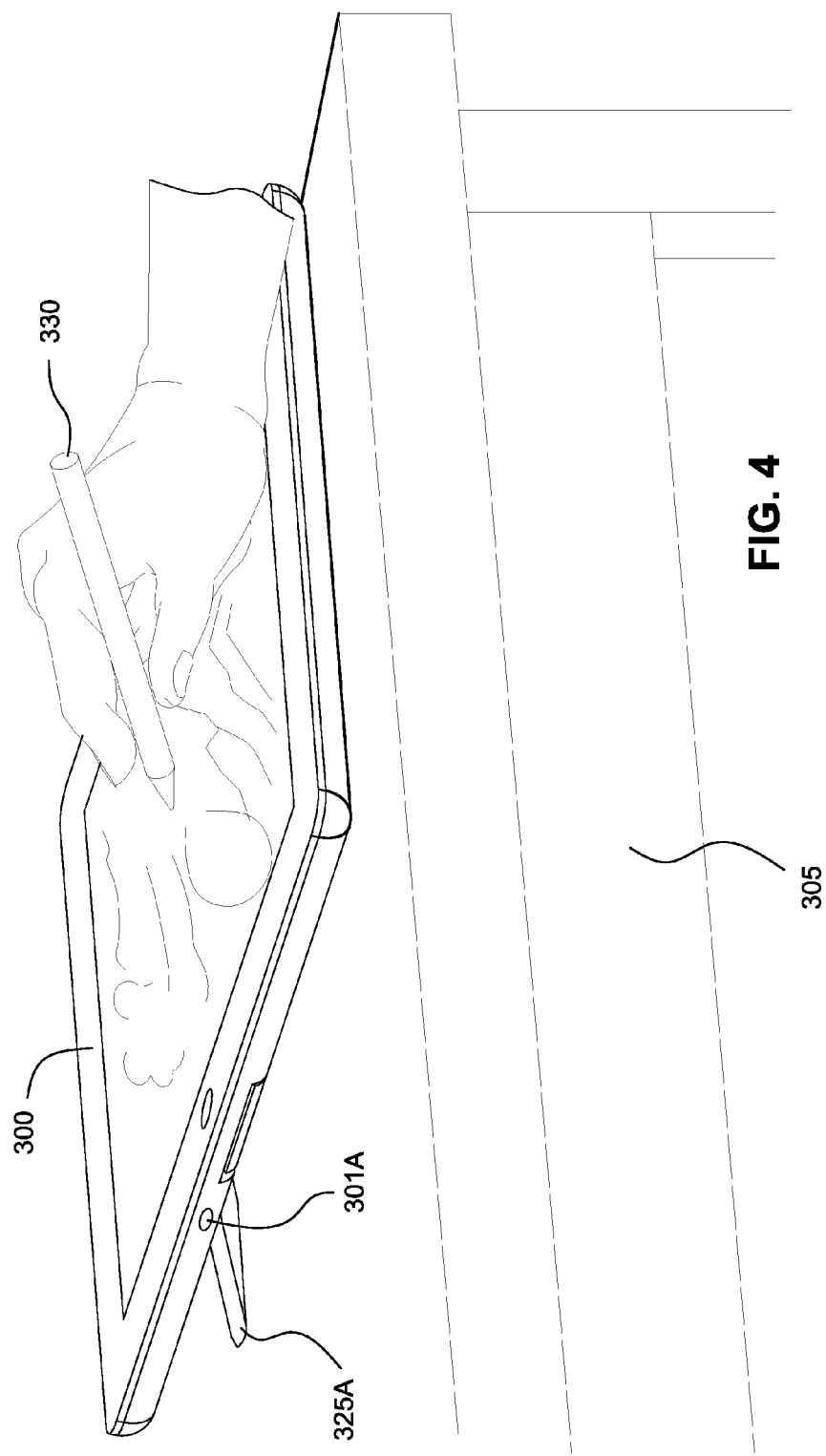

FIGS. 3 and 4 illustrate perspective views of a tablet computing device 300 resting on a fixed surface 305 and being inclined at an angle determined by a built-in rotating lock mechanism and a hinged support panel. FIG. 3 illustrates the tablet computing device 300 in the portrait orientation being written on with an electronic pen 330, and FIG. 4 illustrates the tablet computing device 300 in the landscape orientation being drawn on with an electronic pen 330.

Figure 5A:
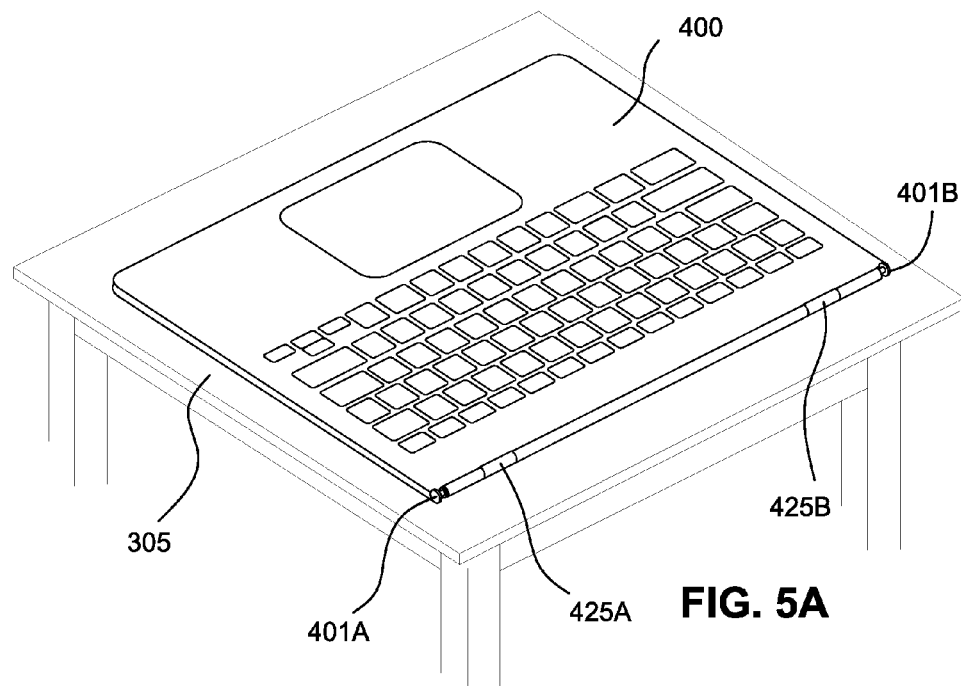
FIGS. 5A and 5B are elevated perspective views of a keyboard device with a load bearing rotation lock mechanism which allows stand panels in the back of the device to be seated in the back of the device, as shown in FIG. 5A, and to swing out from the back when a button is pressed, as shown in FIG. 5B.
Figure 5B:
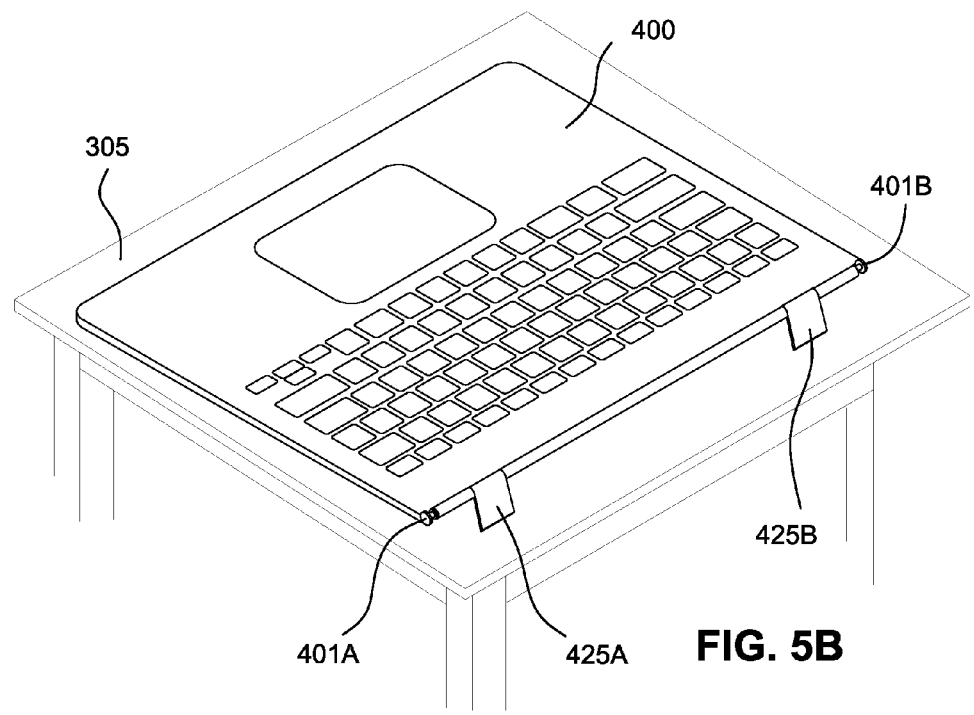

FIGS. 5A and 5B illustrate elevated perspective views of a keyboard device 400 resting against a fixed surface 305 and equipped with a built-in load bearing rotation lock mechanism on either end of the keyboard to allow pivoting stand panels 425A and 425B located at the edge of the keyboard to be seated in the back of the keyboard 400, as shown in FIG. 5A, and to swing out from the back of the keyboard 400 when buttons 401A or 401B are pressed, as shown in FIG. 5B.

Figure 6A:
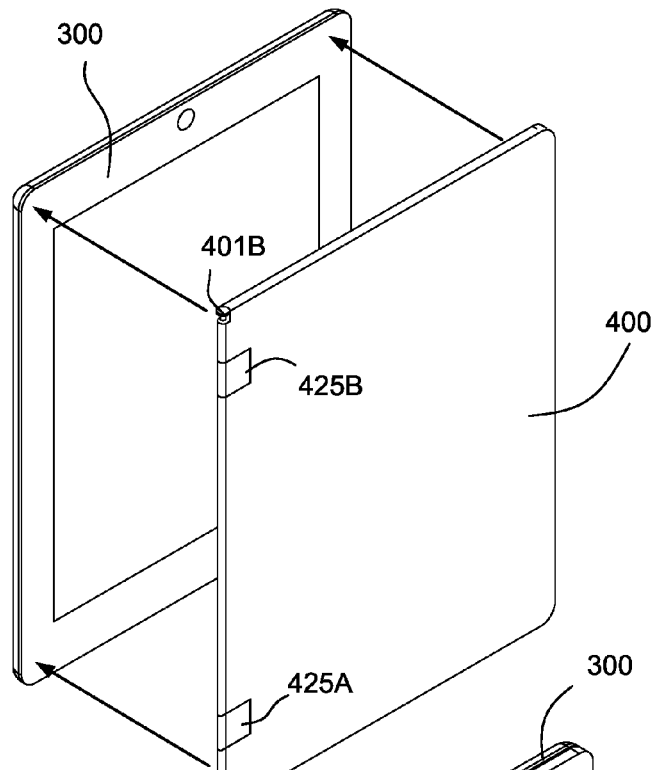
FIGS. 6A and 6B are elevated perspective views of a keyboard device, such as shown in FIGS. 5A and 5B, connectable to a display tablet.
Figure 6B:
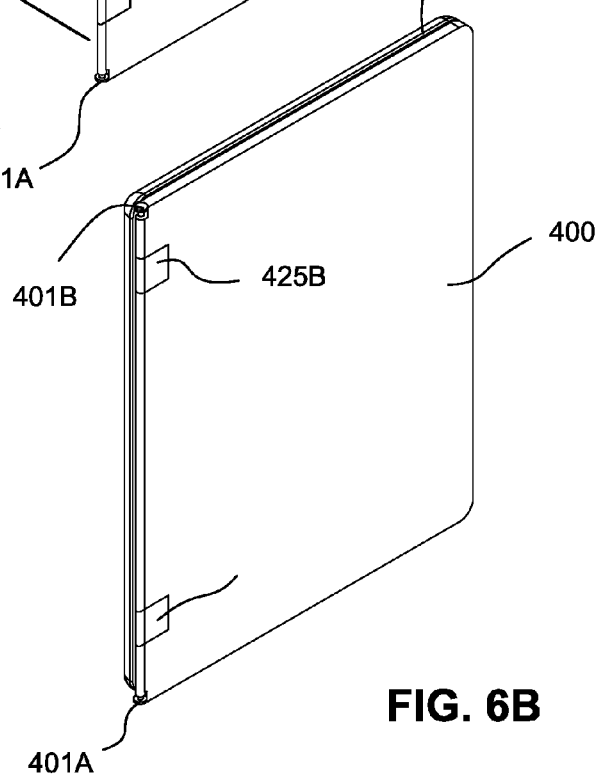

FIGS. 6A and 6B illustrate elevated perspective views of one exemplary embodiment of a keyboard device 400, such as shown in FIGS. 5A and 5B being used as a magnetically attached cover to a display tablet 300.

FIG. 7A shows one exemplary embodiment of a tablet stand including a rotation lock mechanism. FIG. 7A shows a display stand 100 that accepts a display device 105. The display device 105 can be any kind of device such as an iPad tablet, iPad mini tablet, a Nexus 7 tablet, a smart phone, any device including a display having a touch screen, any display device, any computing device, a variety of non-active devices, etc.

The example non-limiting tablet stand 100 includes a base 110, a rotation lock mechanism 101, and a mounting plate 115. In the example shown, the rotation lock mechanism 101 hingably attaches mounting plate 115 to base 110. In this way, mounting plate 115 can assume a variety of different user-settable orientations relative to base 110 while still being attached to the base.

The mounting plate 115 is in one example embodiment with perforated holes located at the four edges of the plate. The holes enable four rubberized holding brackets 116A, 116B, 116C, 116D, each with three rhomboid tipped rubber legs located at every corner of the bracket to be secured to the mounting plate by inserting the rhomboid tipped rubber legs tightly through holes of the perforated mounting plate 115. The rubberized holding brackets 116 can be used to retain display device 105 within mounting plate 115 in such a way that a user can pressably insert the display device into the mounting plate so the mounting plate encases all or part of the display device. Then, when the user wishes to remove the display device 105 from mounting plate 115, the user can flex, bend or otherwise manipulate the mounting rubberized holding brackets to remove the display device from the mounting plate.

Differently-configured mounting plates 115 can be used with different display devices 105. For example, a mounting plate for a Nexus 7 tablet can have inside dimensions of 198.5×120 mm; a mounting plate 115 for an iPad mini can have inside dimensions of 200×134.7 mm; a mounting plate for an iPad can have inside dimensions of 185.7×241.2 mm; a mounting plate for a Microsoft Surface can have inside dimensions of 10.81×6.81 inches; and a mounting plate for a Samsung Galaxy 7 Tab can have inside dimensions of 196.7×133 mm.

In the example non-limiting implementation, base 110 has a rectangular shape with rounded corners and includes a flat side 104 for resting on a surface such as a desktop. Base 110 can be made out of rigid material such as aluminum or plastic to provide adequate cantilevered or other support for stand 100.

Example Non-Limiting Rotation Lock Mechanisms

The example non-limiting rotation lock mechanism 101 provides a locking function that allows a user to change or set the rotational orientation of mounting plate 115 relative to base 110. Rotation lock mechanism 101 holds or locks the mounting plate 115 in the orientation the user set against the force of vibration, gravity and applied user force/pressure via a stylus or finger pressing on the display surface of tablet 105. The rotation lock mechanism 101 also permits the user to adjust the orientation of mounting plate 115 relative to base 110 to avoid glare, to provide a desired angle for viewing or operation of a stylus, and for other purposes. The rotation lock mechanism 101 also permits easy changing of the orientation of mounting plate 115 relative to the base 110, e.g., to collapse the stand 100 into a planar structure that encases the tablet 105 to protect it from damage in case of dropping or impact.

Figure 7B:
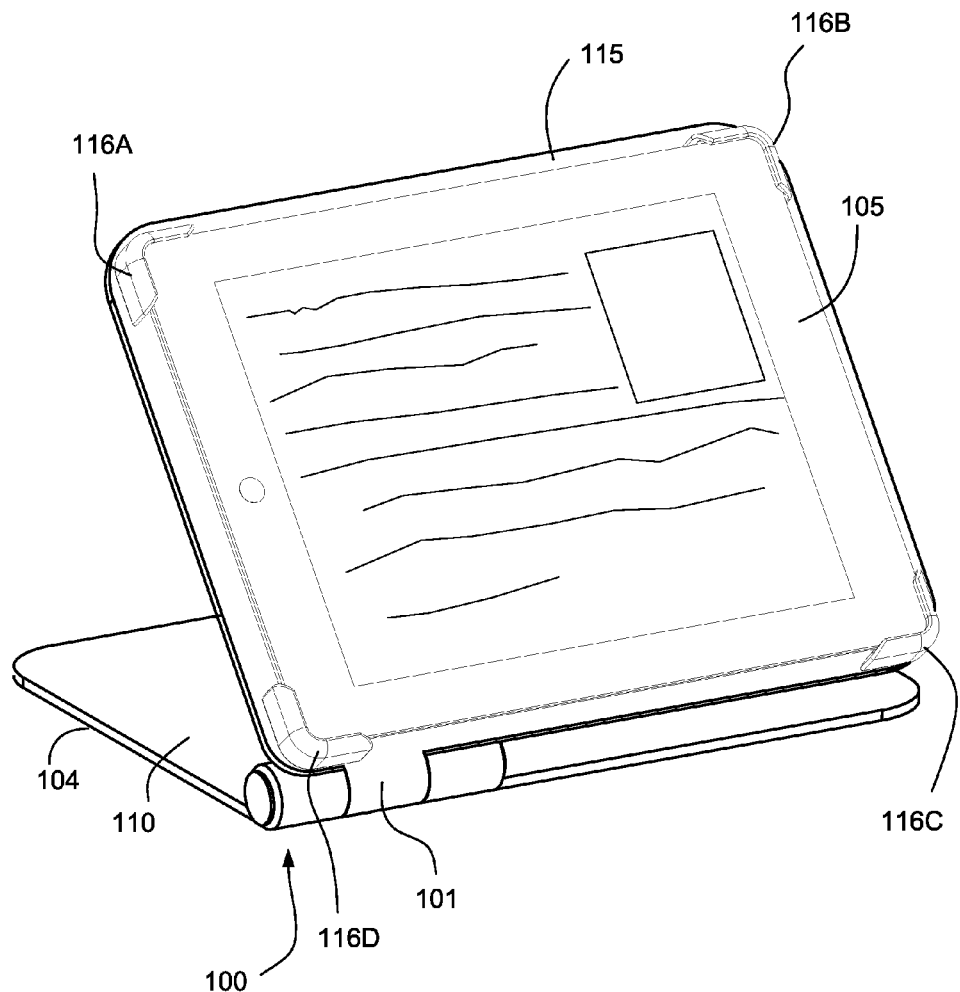

FIG. 7B illustrates a perspective view of the display stand 100 shown in FIG. 7A wherein the rotating lock mechanism 101 holds the tablet computing device 105 at an angular orientation.

Figure 8:
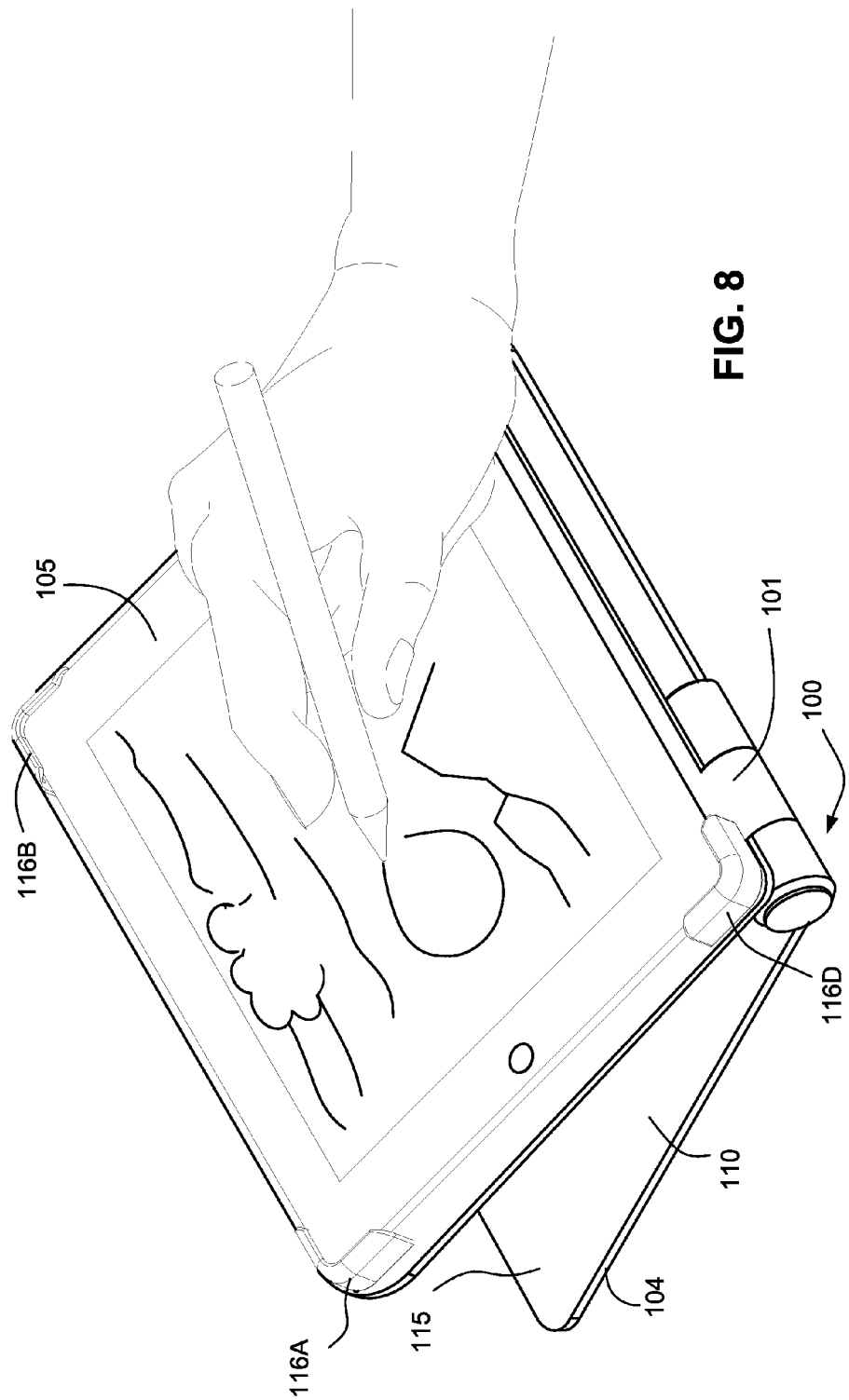
FIG. 8 is a perspective view of the tablet computing device shown in FIGS. 7A and 7B, wherein the rotating lock mechanism holds the tablet computing device at a second angular orientation.

FIG. 8 shows a perspective view of how a user can use the display stand 100 shown in FIGS. 7A and 7B, wherein the rotating lock mechanism 101 holds the tablet computing device at a second angular orientation.

Figure 9A:
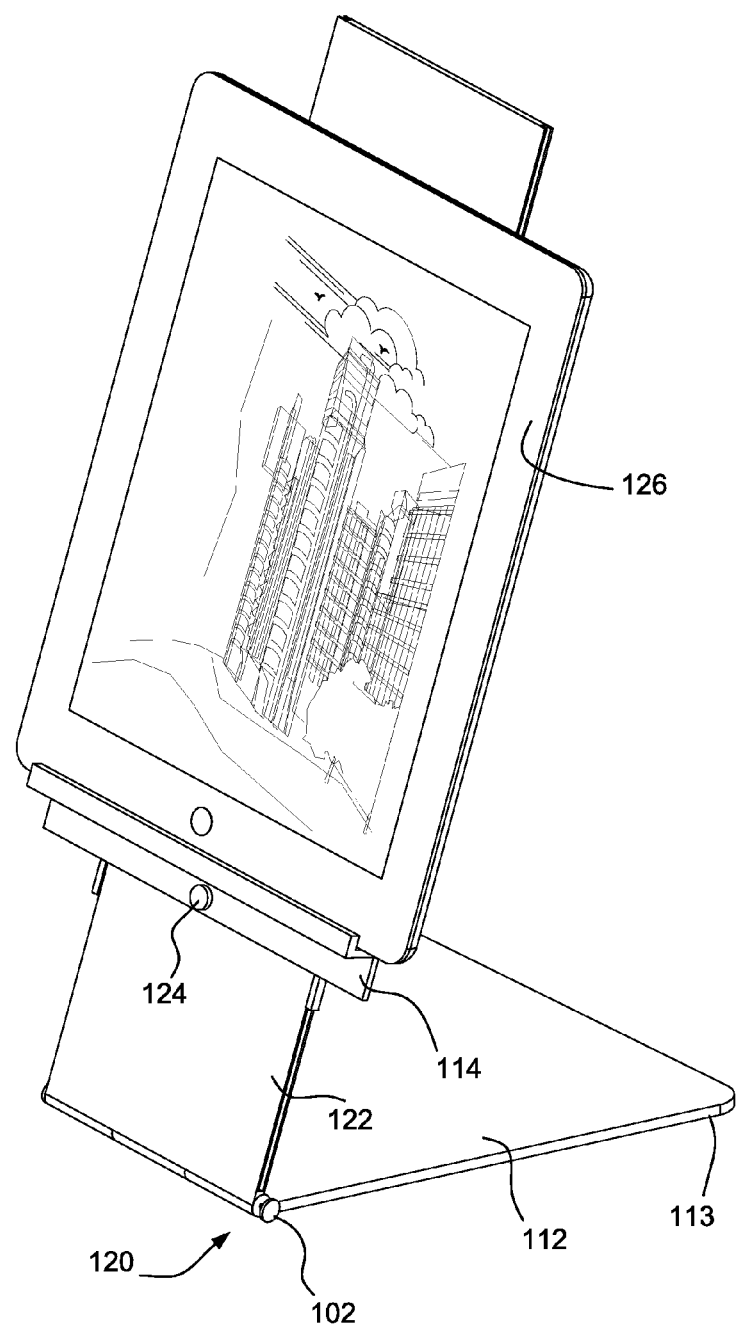
FIGS. 9A and 9B are perspective views of a book or tablet support frame including a hinge between a panel seated on a surface and a second panel supporting the book or tablet, wherein a rotating lock mechanism provides adjustment of the angle between the panels and a push-button actuates the angular adjustment.

FIG. 9A shows another exemplary embodiment of a rotation lock mechanism. It consists of a display stand or stand 120 retaining a display 126. The stand 120 generally includes a base 112, a rotation lock mechanism 102, a mounting arm or other structure 122, and a height adjustment bracket 114. The base 112 in this example non-limiting implementation has a rhomboid shape with rounded corners. The base 112 includes a flat side 113 for resting on a surface such as a desktop. In this case, the height adjustment bracket 114 includes a retaining/mounting channel to retain display device 126 oriented in a portrait or landscape orientation so as to provide any desired viewing orientation for display device 126. The user may twist screw-bolt 124 to raise or lower the display device 126 relative to base 112.

Figure 9B:
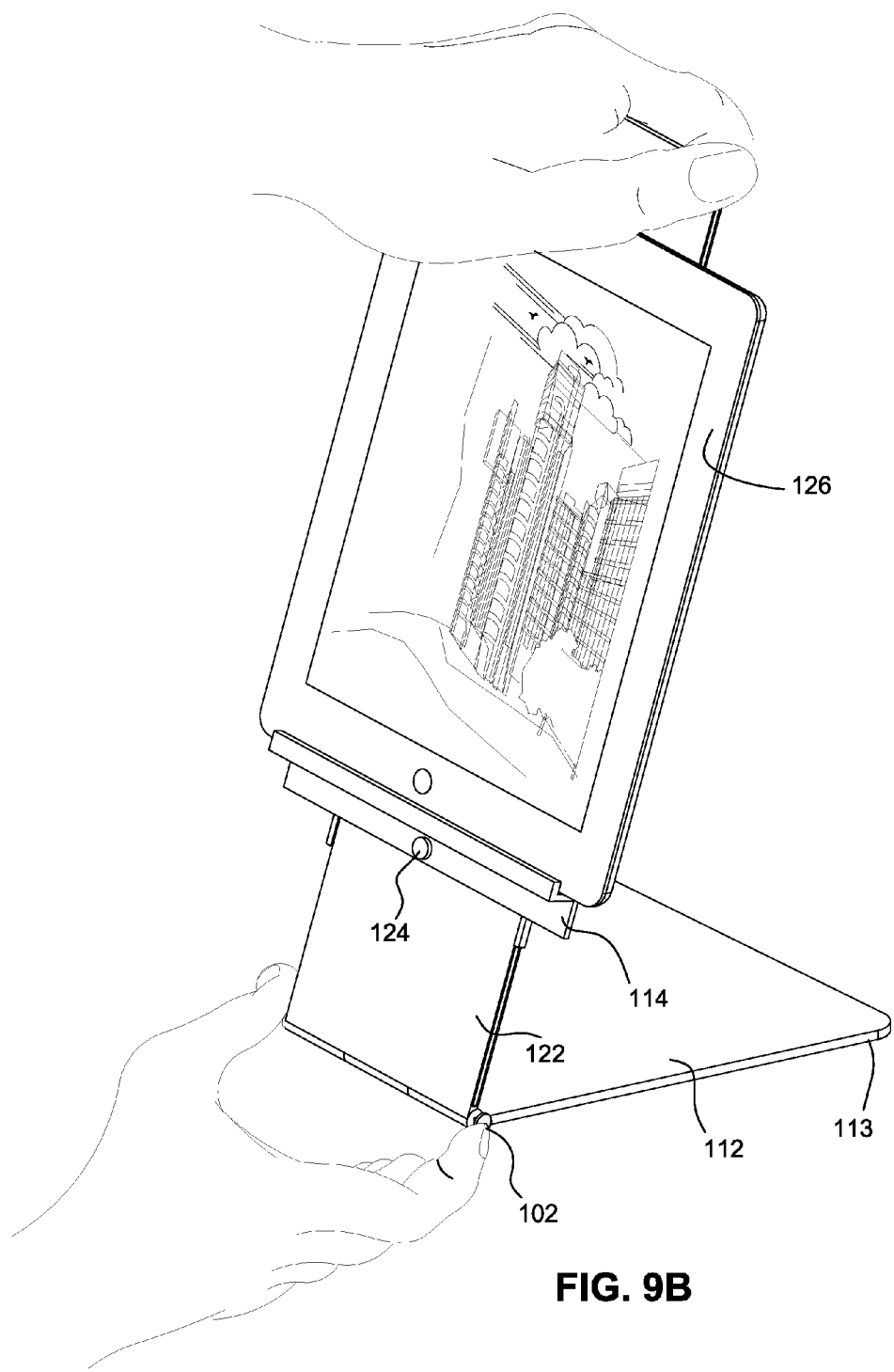

FIG. 9B shows how a user can use two hands to change the orientation of display device 126. In this embodiment, the user uses the index finger of his right hand to depress a control associated with the rotation locking mechanism 102, thereby releasing the rotation locking mechanism. The user may then use his or her left hand to rotate the display device 126 relative to the base 112. Once the user is satisfied with the orientation of display device 126 relative to base 112, the user may release the rotation locking mechanism with his or her right hand to allow the locking mechanism to lock the orientation of display device 126 relative to base 112.

Figure 10:
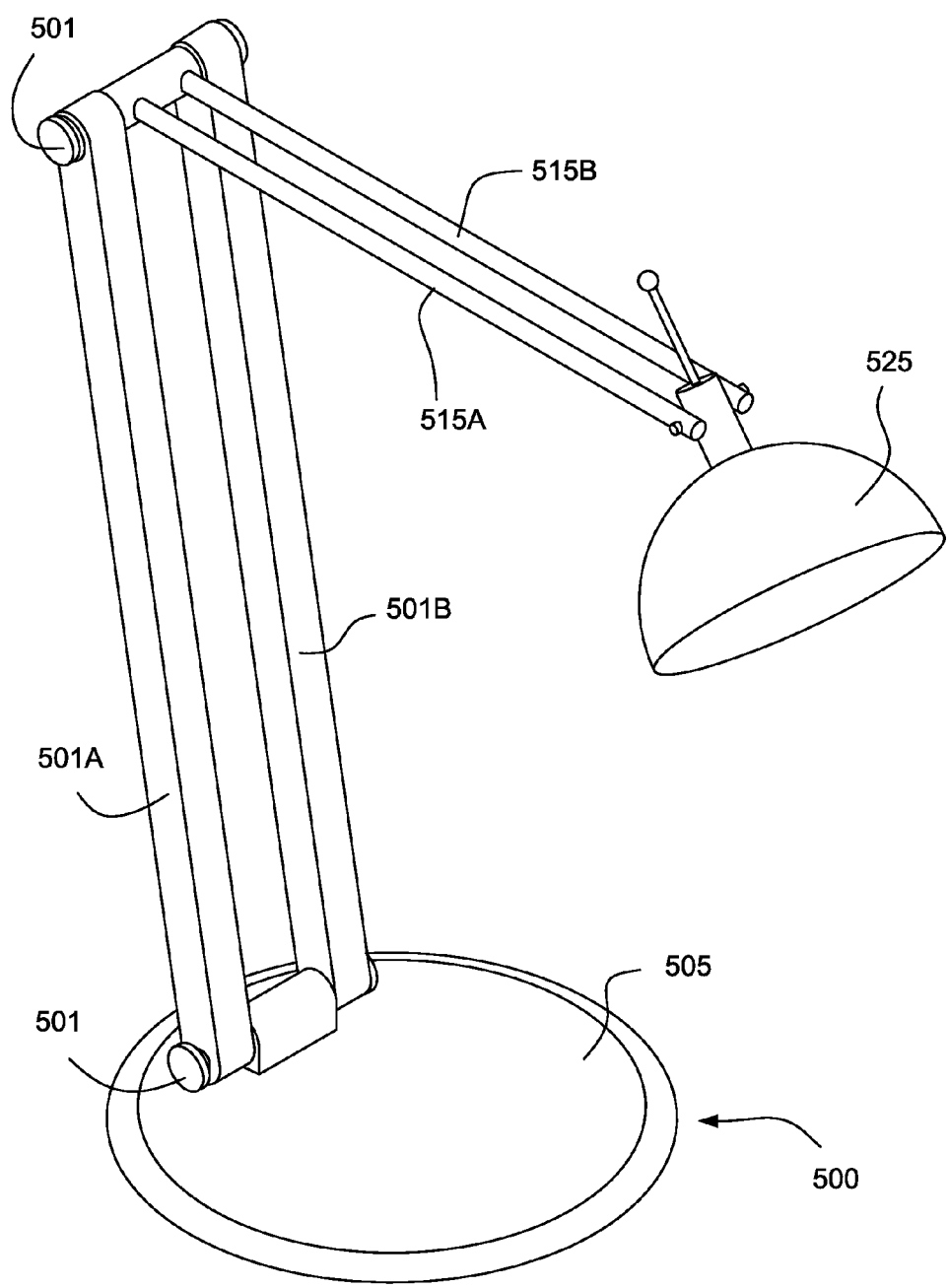
FIG. 10 is an elevated perspective view of a lamp including a pivoting stand having hinged connections between a base and a first leg of the lamp, and between the first leg and a second leg, wherein the hinged connections each include a rotating lock mechanism that provides adjustments of the angles between the first leg and base, and between the first and second legs, and push-buttons that actuate the lock mechanisms.

FIG. 10 illustrates an elevated perspective view of a lamp 500 including a pivoting stand having a hinged connection between a base 505 and a first leg of the lamp 510A and 510B, and between the first leg 501A and 510B and a second leg 515A and 515B, wherein the hinged connections each include a rotating lock mechanism 501 that provides adjustments of the angles between the first leg 510A and 501B and base 505, and between the first 510 and second 515 legs, and push-buttons that actuate the rotation lock mechanisms 501.

Example Internal Details of Non-Limiting Rotation Lock Mechanisms

FIG. 11A represents a cross-sectional embodiment of an internal gear 152, and FIG. 11B represents a cross-sectional embodiment of a spur gear 148. Generally speaking, spur gears or straight-cut gears are a simple type of gear consisting of a cylinder or disk with the teeth projecting radially, where the edge of each tooth is straight and aligned parallel to the axis of rotation. These gears can be meshed together correctly if they are fitted to parallel shafts.

FIG. 12A represents a cross-sectional embodiment of a hex socket 154, and FIG. 12B represents a cross-sectional embodiment of a hex key 149. The hex key 149 can be meshed together correctly with a similarly sized hex socket 154 if they are fitted to parallel shafts.

FIGS. 13A and 13B show a 2D and 3D exemplary embodiment of a rotation lock mechanism using a cylindrical chamber 146 containing a spur gear 148 connected to an exemplary octagonal shaft 150 just before being inserted into an internal gear 152. The internal gear 152 comprises teeth formed within a chamber into which spur gear 148 can be selectively inserted. When the spur gear 148 is inserted into the chamber, the teeth of the spur gear mesh and interlock with the teeth of the internal gear 152 within the cavity. The figure also shows a circular opening 153 at the edge of the chamber for a push-button that would disengage the spur gear 148 out of the internal gear 152. Thus, in one example non-limiting implementation, the spur gear shaft 150 can be displaced along its rotational axis relative to the internal gear to unlock or disengage the spur gear 148 from the internal gear 152. In this way, the user can rotate the spur gear shaft 150 (or a structure attached to the spur gear shaft) to any desired angle or orientation. When the user has rotated the spur gear shaft 150 to a desired position, the user may then insert or reinsert the spur gear 148 into the internal gear 152 cavity, thereby rotationally locking the spur gear 148 (and thus shaft 150, and any structure attached to the spur gear shaft 150) relative to the internal gear 152.

Figure 14A:
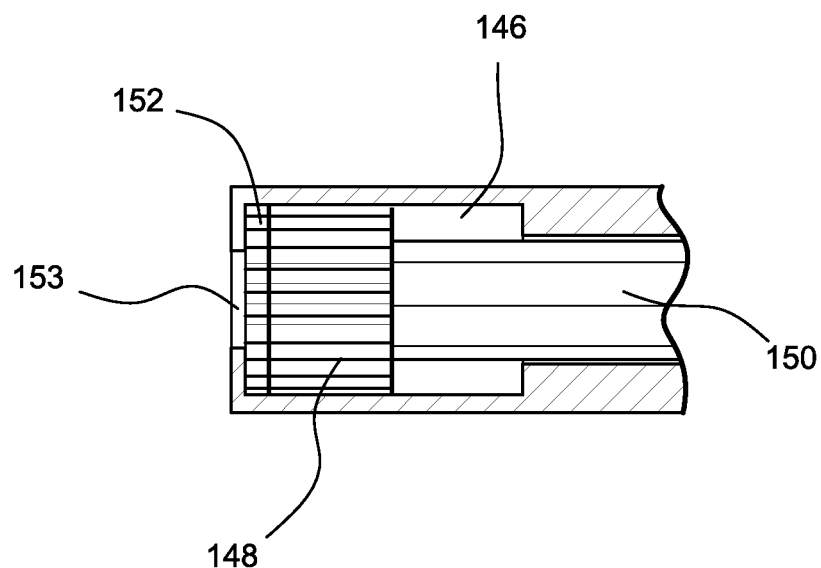
FIGS. 14 A and 14 B show in cross section (FIG. 14 A) and in partial cross section (FIG. 14 B) a chamber housing a disc such as shown in FIGS. 11A and 11B, wherein the disc is in a first receptacle of the chamber.
Figure 14B:
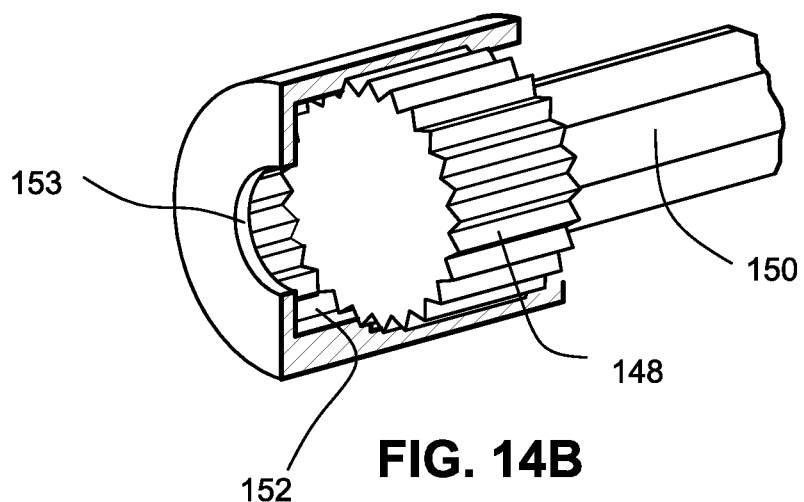

FIGS. 14A and 14B show a 2D and 3D exemplary embodiment in cross-section of a rotation lock mechanism using a cylindrical chamber 146 containing a spur gear 148 connected to an exemplary octagonal shaft 150 just having been inserted into an internal gear 152. The figure also shows a circular opening 153 at the edge of the chamber into which a structure such as a push-button can be inserted. The pushbutton or other structure can be used to disengage the spur gear 148 out of the internal gear 152.

Figure 15A:
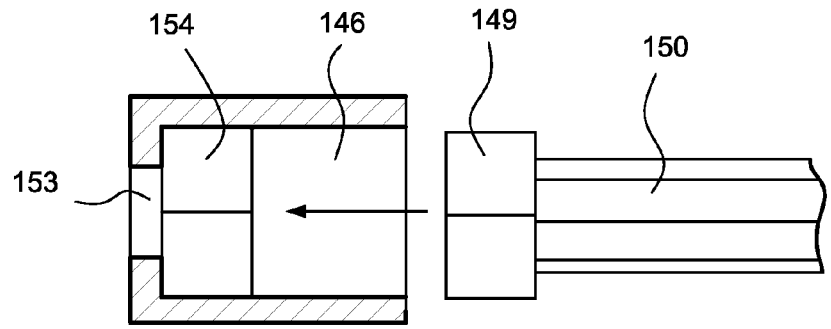
FIGS. 15 A, 15B, and 15C show in cross section (FIG. 15A) and in partial cross section (FIG. 15B and FIG. 15C) a chamber housing a disc such as shown in FIGS. 12A and 12B, wherein the disc is about to enter the second receptacle of the chamber.
Figure 15B:
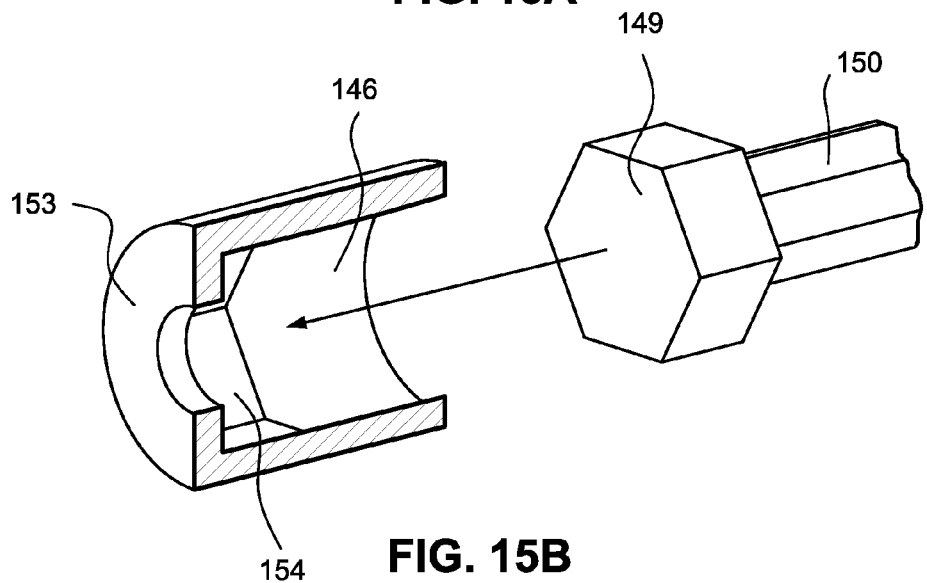

FIGS. 15A and 15B show a 2D and 3D exemplary embodiment of a rotation lock mechanism using an exemplary octagonal shaft 150 connected to a hex key 149 just before being inserted into cylindrical chamber 146 housing hex socket 154. The hex socket 154 comprises edges formed within a chamber into which hex key 149 can be selectively inserted. When the hex key 149 is inserted into the chamber, the edges of the hex key 149 mesh and interlock with the edges of the hex socket 154 within the cavity. The figure also shows a circular opening 153 at the edge of the chamber for a push-button that would disengage the hex key 149 out of the hex socket 154. Thus, in one example non-limiting implementation, the hex key shaft 150 can be displaced along its rotational axis relative to the hex socket to unlock or disengage the hex key 149 from the hex socket 154. In this way, the user can rotate the hex key shaft 150 (or a structure attached to the hex key shaft) to any desired angle or orientation. When the user has rotated the hex key shaft 150 to a desired position, the user may then insert or reinsert the hex key 149 into the hex socket 154 cavity, thereby rotationally locking the hex key 149 (and thus shaft 150, and any structure attached to the hex key shaft 150) relative to the hex socket 154.

Figure 15C:
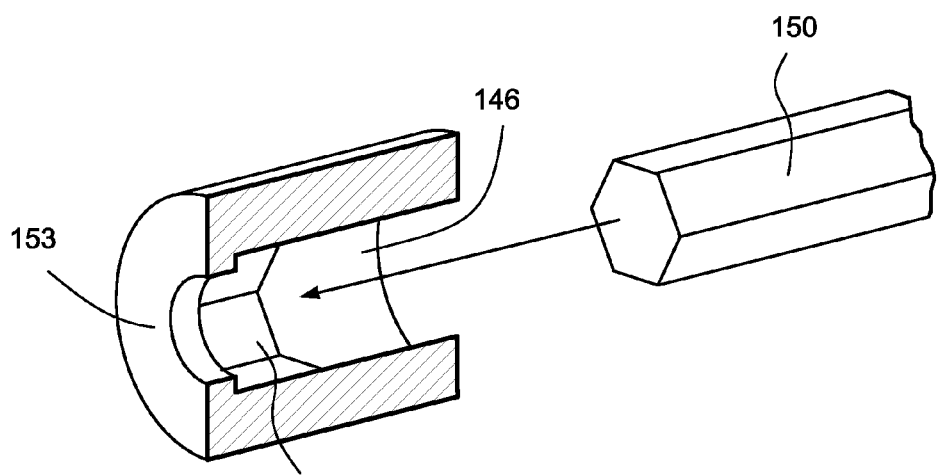

FIG. 15C shows a 3D exemplary embodiment of a rotation lock mechanism using an exemplary octagonal shaft 150 without any fastened disk, cylinder, or gear, just before being inserted into a hollowed cylindrical housing 146 ending in a reverse octagonal socket 154 that can interlock with octagonal shaft 150, freezing the rotation of the shaft and any structure attached to the shaft 150 relative to the reverse octagonal socket—without the need for a separate internal chamber to hold a fastened disk, cylinder, or gear.

Replacing octagonal shaft 150 with a shaft consisting of more facets or a larger number of lateral teeth will enable the rotation lock mechanism to assume a larger number of discreet angular positions, corresponding to the individual number of facets or teeth positioned around the perimeter of the shaft. The figure also shows a circular opening 153 at the edge of the hollowed cylindrical housing for a push-button that would disengage the exemplary octagonal shaft 150 out of the reverse octagonal socket 154.

This embodiment may be useful for a rotation lock mechanism integrated into very thin modern computing devices such as the new iPhone 6 and similar personal computing devices.

Figure 16A:
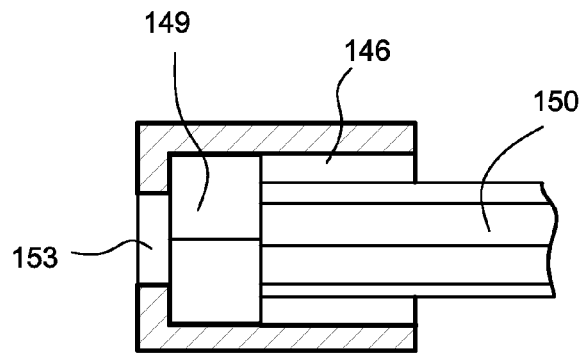
FIGS. 16A, 16B, and 16C show in cross section (FIG. 16A) and in partial cross section (FIG. 16B and FIG. 16C) a chamber housing a disc such as shown in FIGS. 12 A and 12 B, wherein the disc is in a first receptacle of the chamber.
Figure 16B:
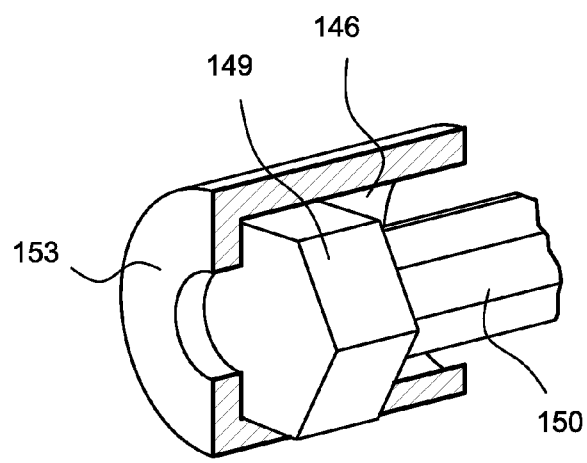

FIGS. 16A and 16B show a 2D and 3D exemplary embodiment in cross-section of a rotation lock mechanism using a cylindrical chamber 146 containing a hex key 149 connected to an exemplary octagonal shaft 150 just having been inserted into a hex socket 154. The figure also shows a circular opening 153 at the edge of the chamber into which a structure such as a push-button can be inserted. The pushbutton or other structure can be used to disengage the hex key 149 out of the hex socket 154.

Figure 16C:
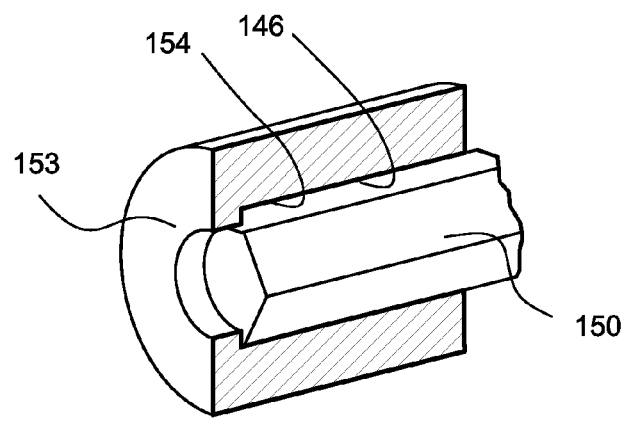

FIG. 16C shows a 3D exemplary embodiment in cross-section of a rotation lock mechanism using a cylindrical housing 146 containing an exemplary octagonal shaft 150 just having been inserted into a reverse octagonal socket 154. The figure also shows a circular opening 153 at the edge of the cylindrical housing into which a structure such as a push-button can be inserted. The pushbutton or other structure can be used to disengage the exemplary octagonal shaft 150 out of the reverse octagonal socket 154 that is located at the edge of the cylindrical housing.

Figure 17A:
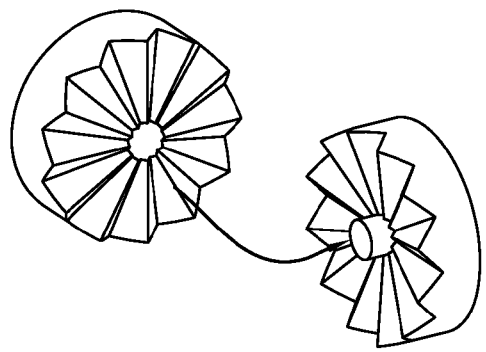
FIGS. 17A to 17D illustrate a three-dimensional perspective view of several example non-limiting notched, grooved, and pinned plates and cylinders made up of diametrically inverse grooves, notches, and holes that may be meshed together to fix the rotational position of a shaft.
Figure 17B:
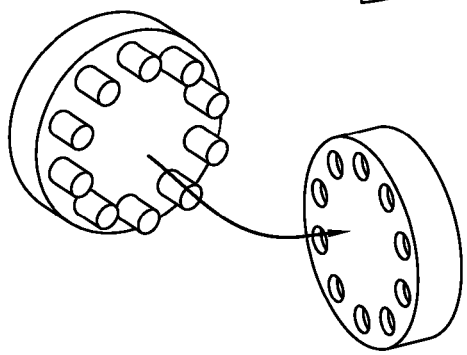
Figure 17C:
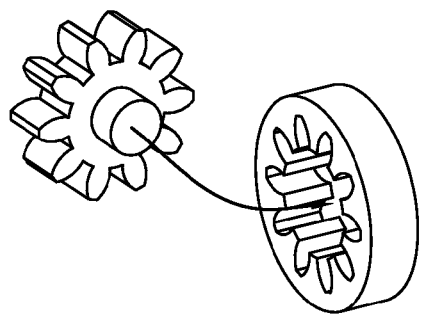
Figure 17D:
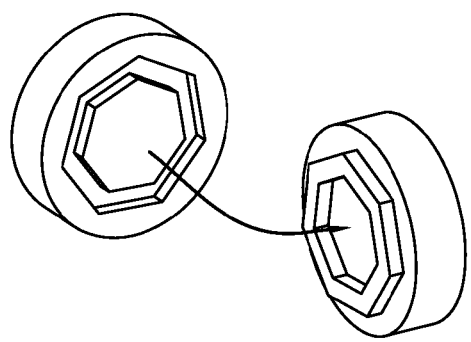

FIGS. 17A to 17D illustrate embodiments of disc with teeth and receptacles for the disc, wherein FIGS. 17A, 17B and 17D show a disc with teeth extending axially from a front face of the disc and a front face of the receptacle has recesses for the teeth, and FIG. 17C shows a disc with teeth extending radially outward from the disc and the receptacle include radially extending recesses to receive the teeth. These embodiments represent several example non-limiting disks and receptacles that may be meshed together to fix the rotational position of a shaft.

Figure 18:
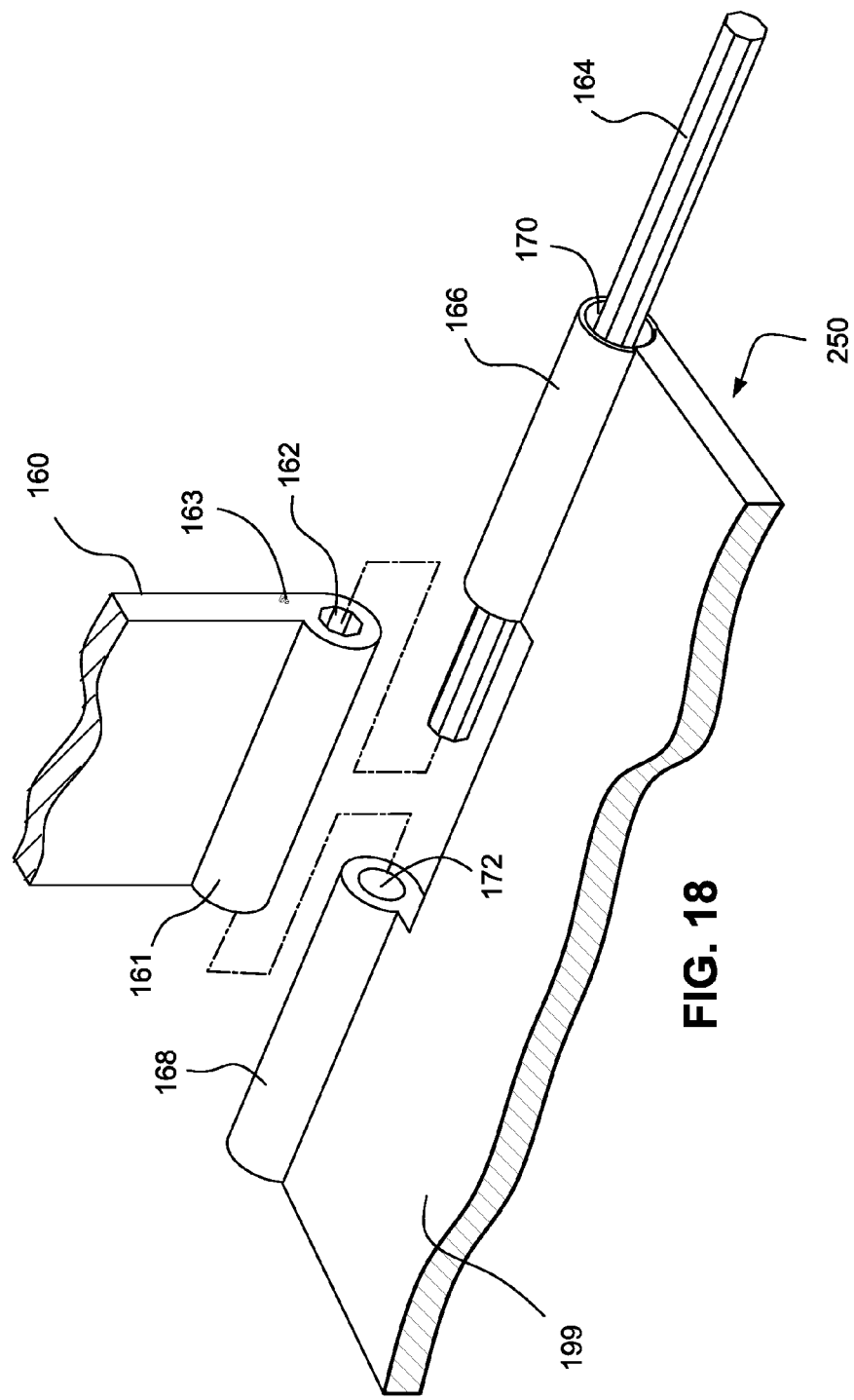
FIG. 18 is a partial cross-sectional and three-dimensional (perspective) partially exploded representation of an example non-limiting rotation lock mechanism hinge illustrating how the multi-sided shaft engages the mid-section of the hinge while rotating freely within the other two sides of the hinge.

FIG. 18 shows a 3D side view in partial cross-section of an exemplary embodiment of a hinge 199 and how that hinge's shaft 164 keys into and engages the middle cylinder of the hinge 161 though an octagonal opening in the middle cylinder 162. As the octagonal shaft 164 rotates, the hinge plate 160 that is connected to the middle cylinder 161 rotates. The figure also shows how the shaft 164 is inserted into and passes through the left side cylinder of the hinge 168 through a circular opening 172. The octagonal shaft 164 thus passes through the octagonal passage 162 defined in hinge 161 to retain structure 160. In the example shown, the hinge 160 is thus rotatably locked to and rotates with shaft 164.

FIG. 19 shows an elevated perspective and partial cross-sectional view of a non-limiting embodiment of a rotation lock mechanism hinge 250 with optional spring 190 and associated restraining pin fastener 163 setting a default position for hinge plate 160 with respect to base plate 199.

Example Non-Limiting Dynamic Structure of Rotation Lock Mechanisms

Figure 20A:
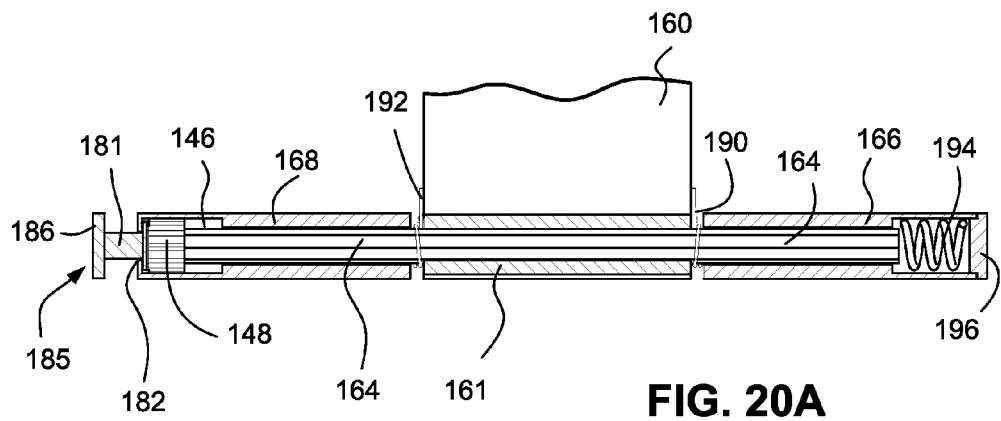
FIG. 20A shows a cross-sectional view of the example non-limiting rotation lock mechanism with the button extended/protruding in a default "locked" position.
Figure 27:
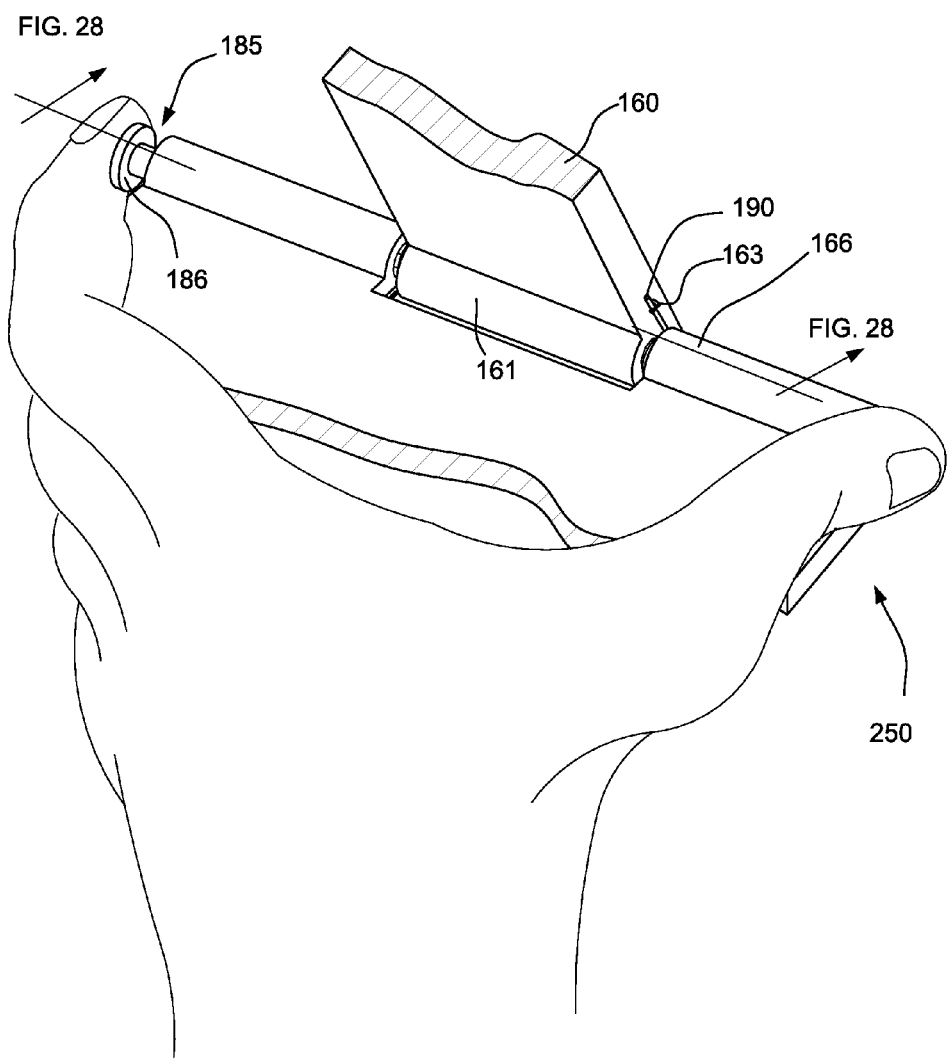
FIG. 27 is a three-dimensional representation in partial cross-section of a rotation lock mechanism in the "locked" position (button un-pressed) with the hinge's mid-section in the forward leaning position and a user depressing the button to allow the hinge to rotate.

FIG. 20A illustrates a cross section of a non-limiting embodiment of a rotation lock mechanism hinge showing a spring 194 disposed in a chamber in the right side cylinder of the hinge 166 pushing a spur gear 148 into an internal gear 152 of the left side cylinder 168 through the shaft 164, locking the hinge plate 160 in its current angular position. The force exerted by spring 194 also pushes button 185 outwardly to a protruding, locked position (see for example FIG. 27).

Figure 20B:
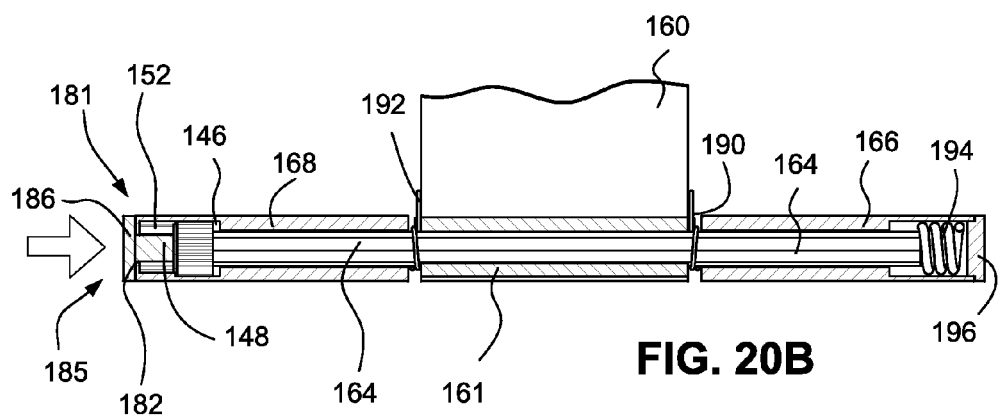

FIG. 20B illustrates a cross section of a non-limiting embodiment of a rotation lock mechanism hinge showing the button 185 being pressed into the left side cylinder of the hinge 168 against the force of spring 194, pushing a spur gear 148 out of engagement with internal gear 152, compressing the spring 194, and freeing the hinge plate 160 to pivot around the axis of the hinge. Button 185 can be pressed by a finger or thumb (see for example FIG. 27).

Figure 20C:
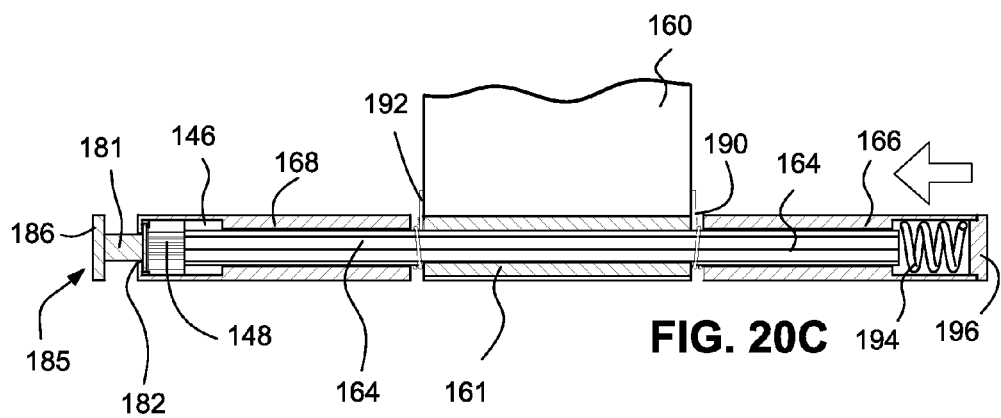
FIG. 20C shows a cross-section of the FIG. 20B rotation lock mechanism back in the default "locked" position after the button is released and a spring, on the right side, has pushed the spur gear back into the internal gear.

FIG. 20C illustrates a cross section of a non-limiting embodiment of a rotation lock mechanism hinge showing a spring 194 in the right side cylinder of the hinge 166 upon release of button 185 pushing a spur gear 148 back into internal gear 152 of the left side cylinder 168 through the shaft 164, locking the hinge plate 160 in whatever angular position it was in at the time of the release of the button 185.

Figure 21A:
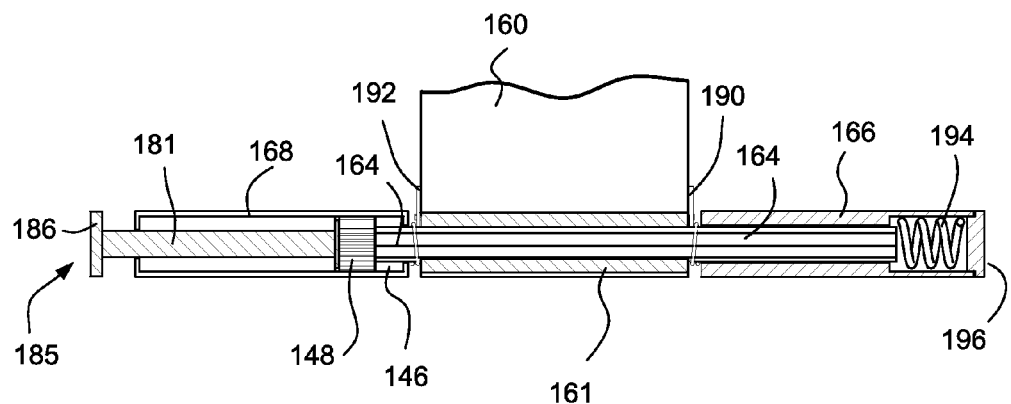
FIG. 21A shows a cross-sectional view of the example non-limiting rotation lock mechanism with the locking mechanism located at an opposing end of one of the cylinders of the hinge with the push-button in the "locked" extended/protruding position.

FIG. 21A shows a cross-sectional view of the example non-limiting rotation lock mechanism of FIG. 20A-FIG. 20C with the locking mechanism located at an opposing end of side cylinder 168 of the hinge with the push-button 185 in the "locked" extended/protruding position.

Figure 21B:
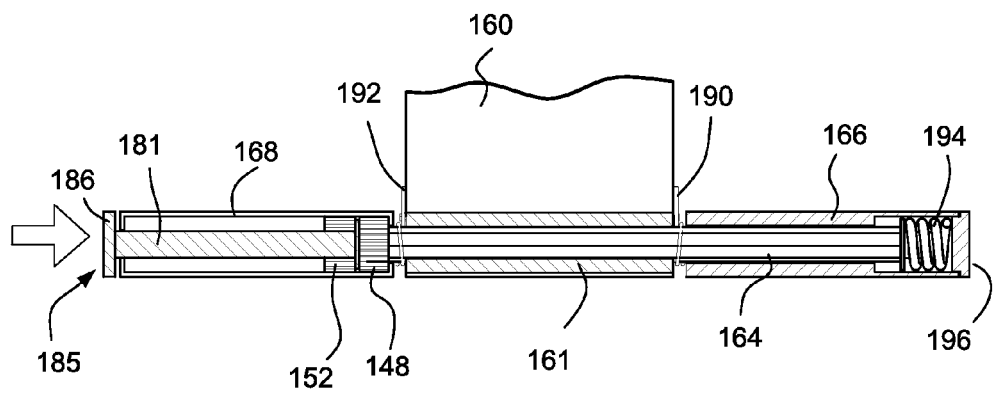

FIG. 21B shows a cross-sectional view of the example non-limiting rotation lock mechanism of FIG. 20A-FIG. 20C with the locking mechanism located at an opposing end of side cylinder 168 of the hinge with the push-button in the "unlocked" position after the button 185 had been pushed in.

Figure 22:
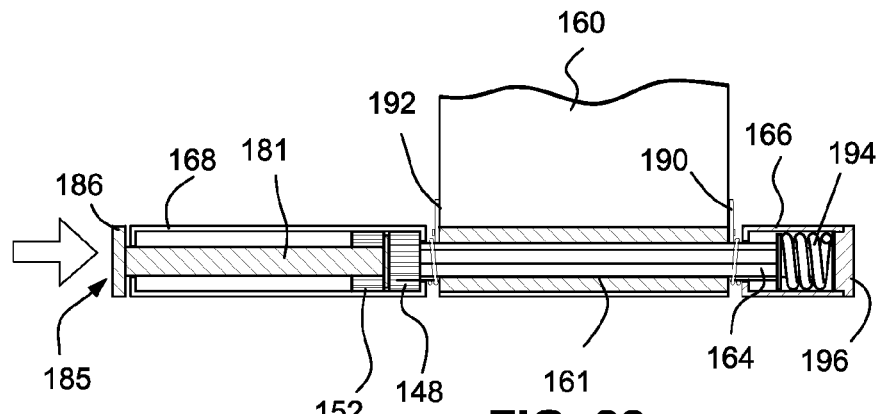
FIG. 22 shows a cross-sectional view of the example non-limiting rotation lock mechanism with one side-cylinder; the cylinder containing the "pushback" spring, "shortened" or "condensed" to accommodate certain embodiments that may limit the span of the rotation lock mechanism.

FIG. 22 shows a cross-sectional view of the example non-limiting rotation lock mechanism of FIG. 20A-FIG. 20C with the right-side cylinder 166; the cylinder containing the "pushback" spring, "shortened" or "condensed" to accommodate certain embodiments that may limit the span of the rotation lock mechanism.

Figure 23:
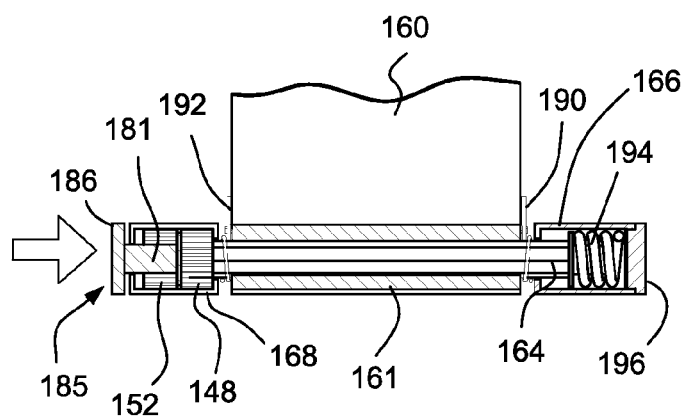
FIG. 23 shows a cross-sectional view of the example non-limiting rotation lock mechanism with both side-cylinders "shortened" or "condensed" to accommodate certain embodiments that may further limit the span of the rotation lock mechanism.

FIG. 23 shows a cross-sectional view of the example non-limiting rotation lock mechanism of FIG. 20A-FIG. 20C with both side-cylinders 166 and 168 "shortened" or "condensed" to accommodate certain embodiments that may further limit the span of the rotation lock mechanism.

Figure 24:
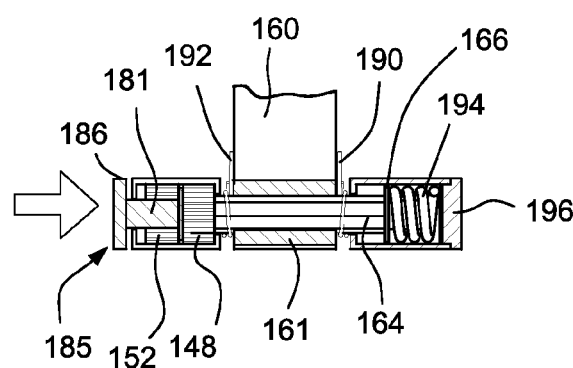
FIG. 24 shows a cross-sectional view of the example non-limiting rotation lock mechanism with all cylinders "shortened" or "condensed" to accommodate certain embodiments that may limit both the size and the location of the rotation lock mechanism.

FIG. 24 shows a cross-sectional view of the example non-limiting rotation lock mechanism of FIG. 20A-FIG. 20C with all cylinders "shortened" or "condensed" to accommodate certain embodiments that may limit both the size and the location of the rotation lock mechanism.

Figure 25A:
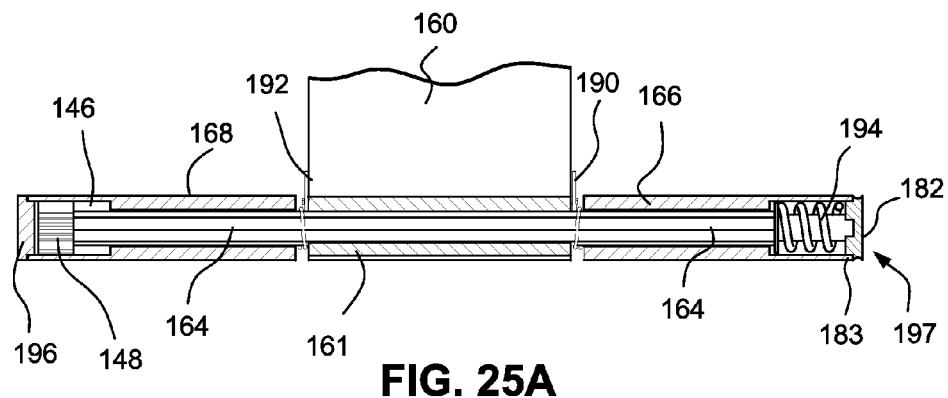
FIG. 25A shows a cross-sectional view of the example non-limiting rotation lock mechanism with a "pull" button attached to the shaft with the multi-sided cross section in a default "locked" position.

FIG. 25A illustrates a cross-sectional view of the example non-limiting rotation lock mechanism of FIG. 20A-FIG. 20C modified such that the shaft with the multi-sided cross section 164 is fastened to a pull-button 197 consisting of a secondary cylindrical short shaft 183 threaded into a cap 182 with the spring 194 disposed in cylinder 166 and pushing spur gear 148 into internal gear 152 in a default "locked" position and cylinder 168 is capped with threaded cap 196.

Figure 25B:
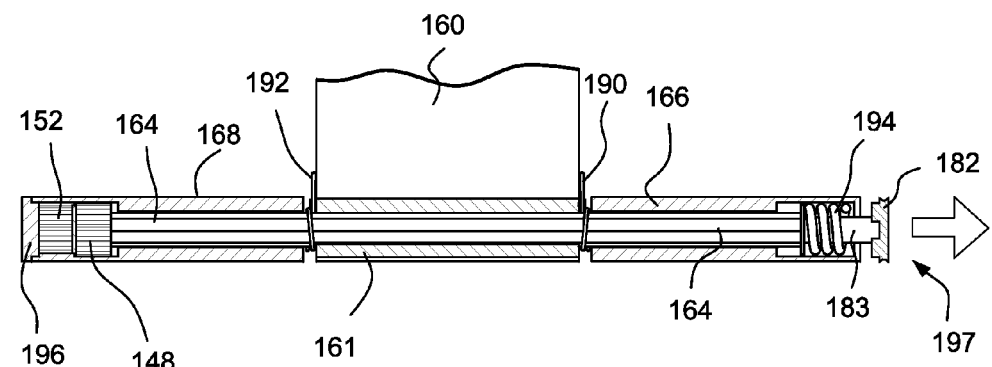
FIG. 25B shows a cross-sectional view of the example non-limiting rotation lock mechanism with a "pull" button attached to the shaft with the multi-sided cross section in the "unlocked" position, after the pull-button has been pulled.

FIG. 25B illustrates the example non-limiting rotation lock mechanism of FIG. 25A with pull-button 197 being pulled from the right side cylinder of the hinge 166 against the force of the spring 194, pulling the spur gear 148 out of engagement with internal gear 152 through the shaft 164, compressing the spring 194, and freeing the hinge plate 160 to pivot around the axis of the hinge.

Figure 25C:
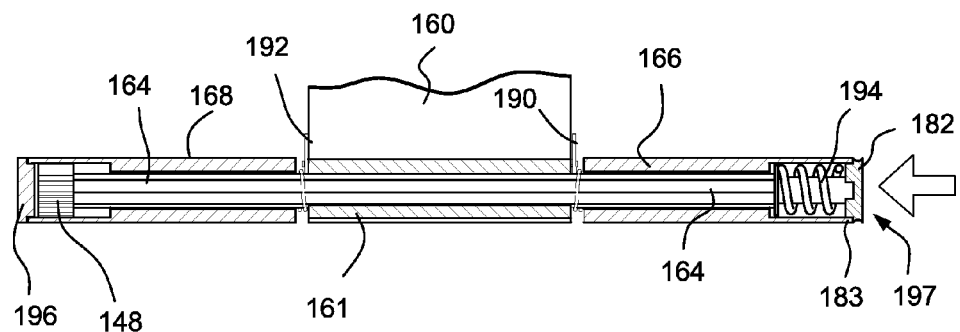
FIG. 25C shows a cross-section of the FIG. 25B rotation lock mechanism back in the default "locked" position after the pull-button is released and a spring, on the right side, has pushed the spur gear back into the internal gear.

FIG. 25C illustrates the example non-limiting rotation lock mechanism of FIG. 25A with the rotation lock mechanism hinge showing the spring 194 in the right side cylinder of the hinge 166 upon release of pull-button 197 pushing the spur gear 148 back into internal gear 152 of the left side cylinder 168 through the shaft 164, locking the hinge plate 160 in whatever angular position it was in at the time of the release of pull-button 197

Figure 26:
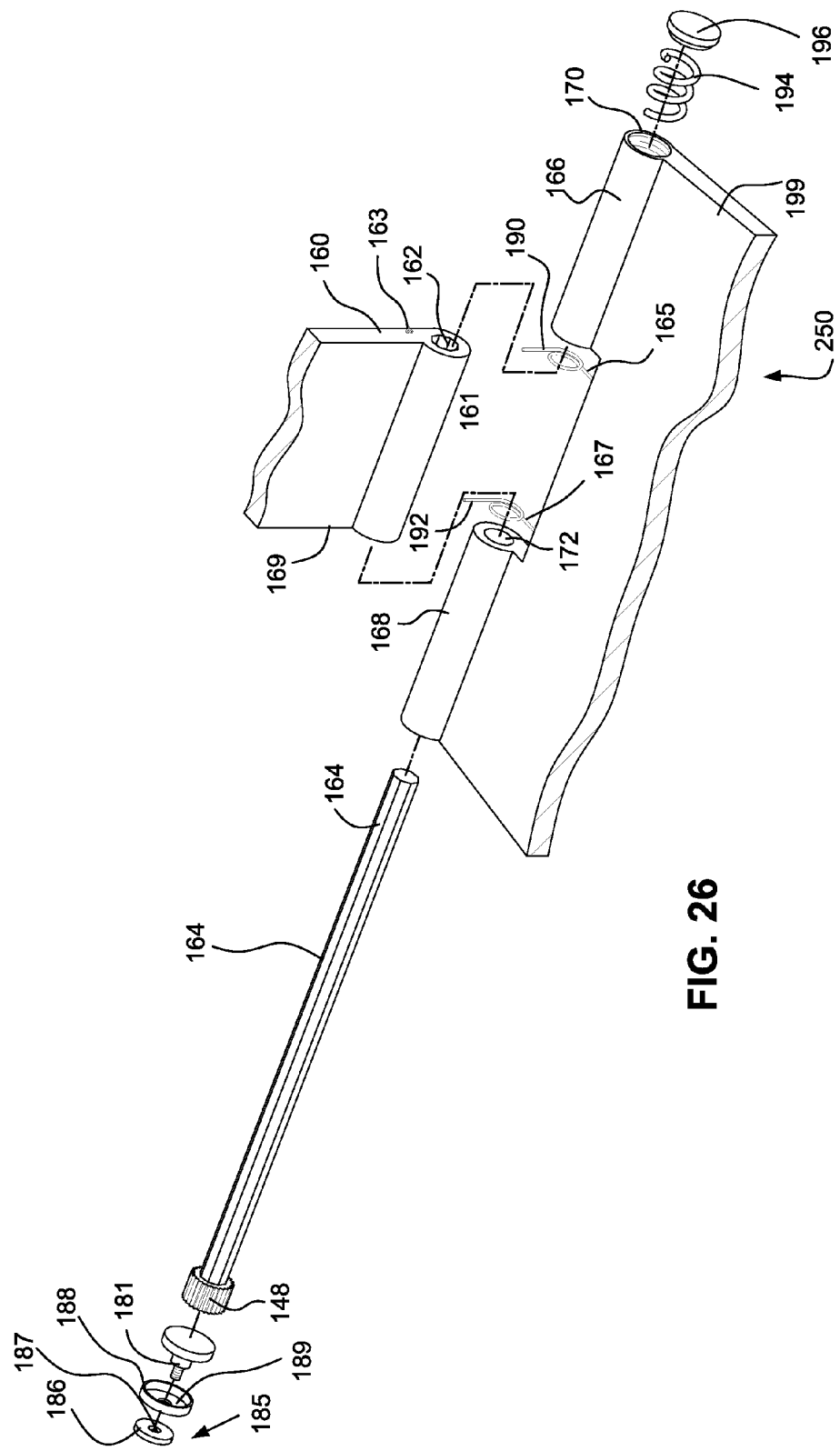
FIG. 26 is a three-dimensional perspective exploded view of an example non-limiting rotation lock mechanism showing how the individual components fit together to make the device work.

FIG. 26 illustrates a three-dimensional exploded view representation of the example non-limiting rotation lock mechanism 250 showing how the individual components fit together to make the device work. In particular, this illustration displays optional additional springs 190 and 192, and associated restraining pin fasteners 163 and 169, and holes, 165 and 167. The optional springs 190 and 192 provide the rotation lock mechanism with a default position when the button 185 is pressed, which can be useful in some applications.

The optional springs 190 and 192, which may consist of one or more loops, loop around the shaft 164 and attach, from one side, to pin fasteners 163 and 169, located on either side of the center hinge plate 160, and from the other side, they can attach either to corresponding pin fasteners on the left and right side cylinders 166 and 168, or they can be snugly secured into the base plate 199 by being inserted into holes 165 and 167 drilled into the middle of the side of the base plate 199. These springs provide a default angular position for the central hinge plate 160 when the button 185 is pushed and its plunger 181 disengages the spur gear from the internal gear. It also prevents the center hinge plate 160 from collapsing into the base plate 199 when the button is pressed.

This illustration also shows how the threaded cap 196 provides support for the spring 194 and caps one side of the hinge. A similar threaded cap 188 with a drilled eyelet 189 is placed on the other side of the hinge to cap the other end of the hinge while allowing the threaded plunger 181 to pass through the threaded cap 188 and attach to the push-button top 186 through the threaded cavity 187 to form a full button 185.

As noted above, FIG. 27 shows a 3D representation of the initial fixed angular position of a center hinge plate 160 of a hinge 250.

Example Flip Chart Animation

FIG. 28A-39A show how a load bearing rotation lock mechanism 250 can move a hinge plate 160 from one fixed angular position to another fixed angular position through the press of a button 185. These figures are structured as a flip chart style animation, so that repeated use of a down page key of a pdf or other viewer for viewing this patent can allow you to see how the structure works and rotates.

Figure 29A:
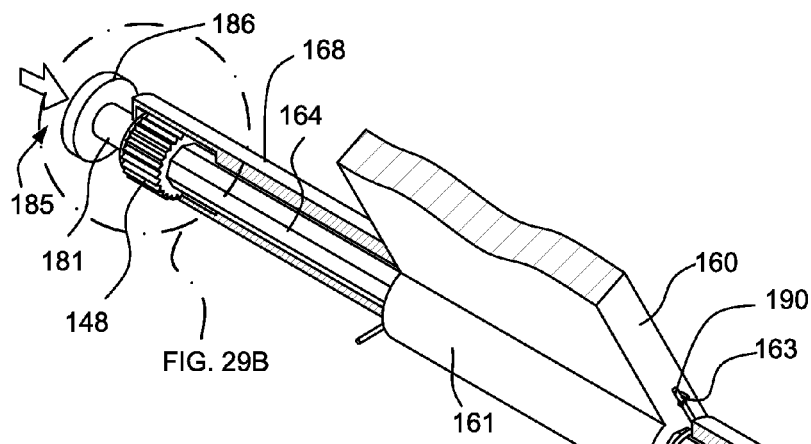
Figure 29B:
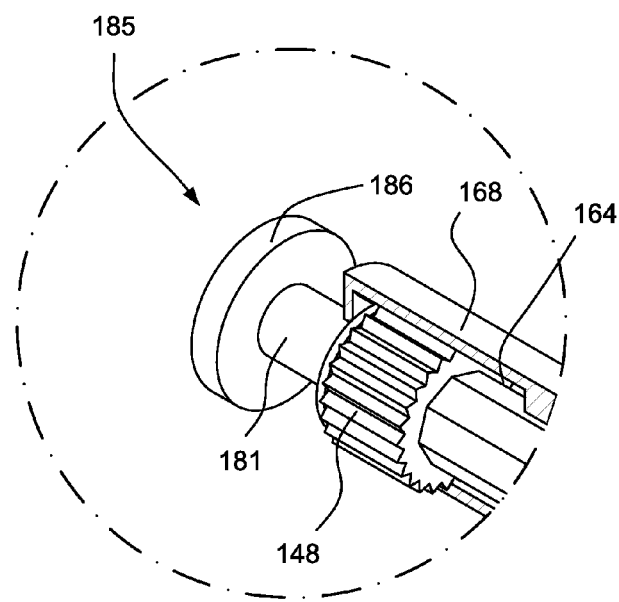
Figure 30A:
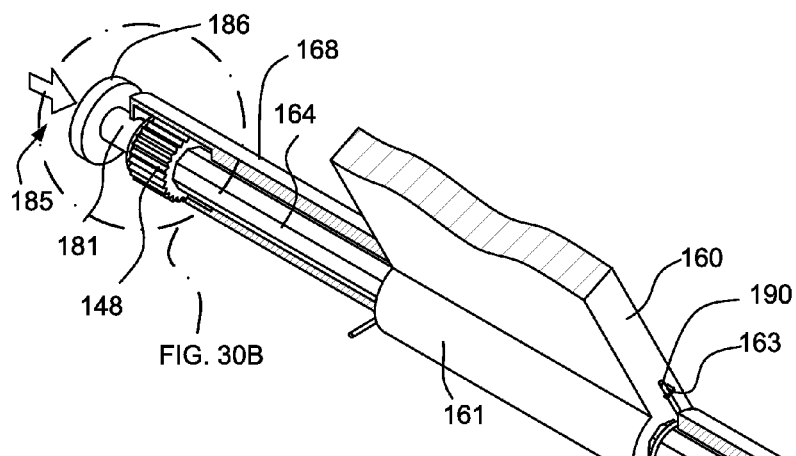
Figure 30B:
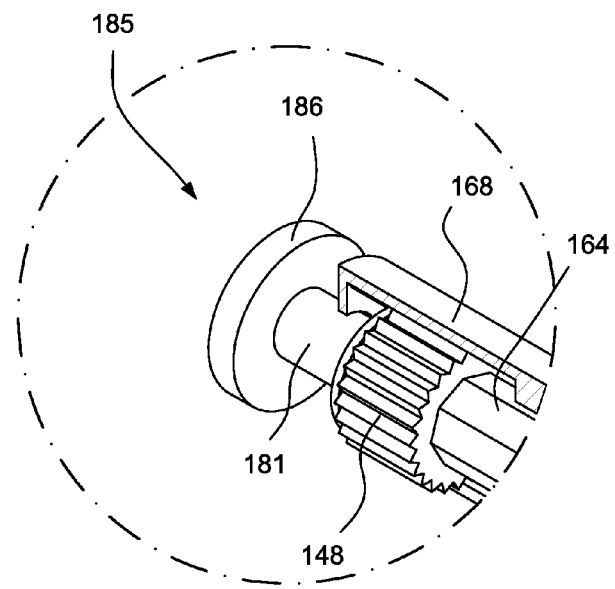

FIGS. 28A and 28B show the initial, un-pressed, position of a push-button 185, with the spur gear 148 snugly inside internal gear 152 and the corresponding fixed angular position of hinge plate 160 with force just beginning to be applied. FIGS. 29A/29B and 30A/30B show the button 185 being pushed in this embodiment such that spur gear 148 begins disengaging from internal gear 152.

FIGS. 31A/31B show button 185 fully depressed so that spur gear 148 is completely disengaged from internal 152, thereby permitting hinge 161 and shaft 164 to rotate together relative to the base. Thus, FIGS. 31A and 31B show button 185 in the pressed position causing the push-button's plunger 181 to push the spur gear 148 out of the internal gear 152.

Figure 32A:
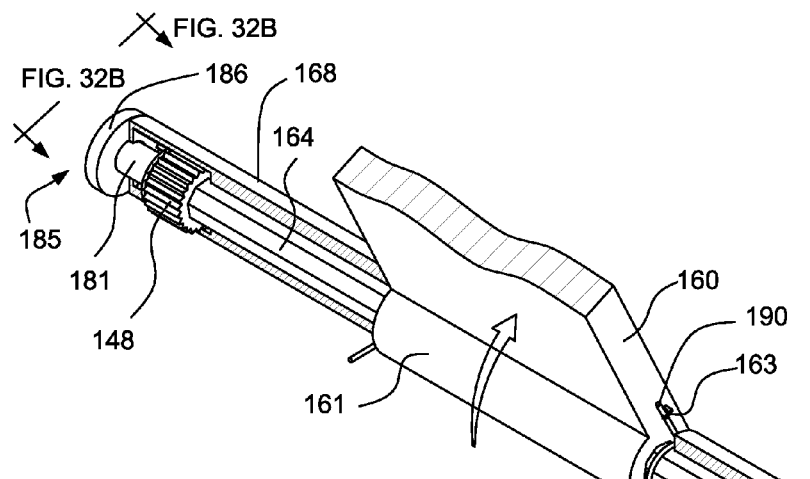
Figure 32B:
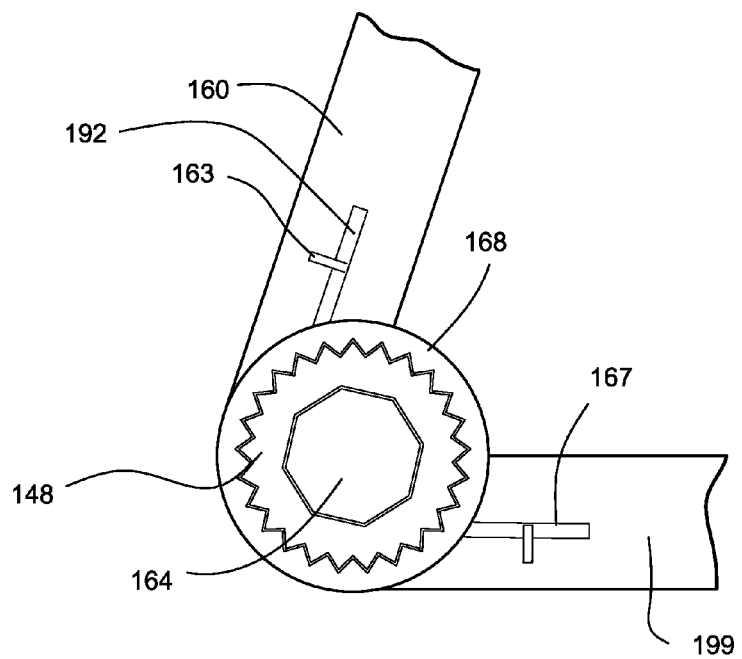
Figures 33A, 33B:
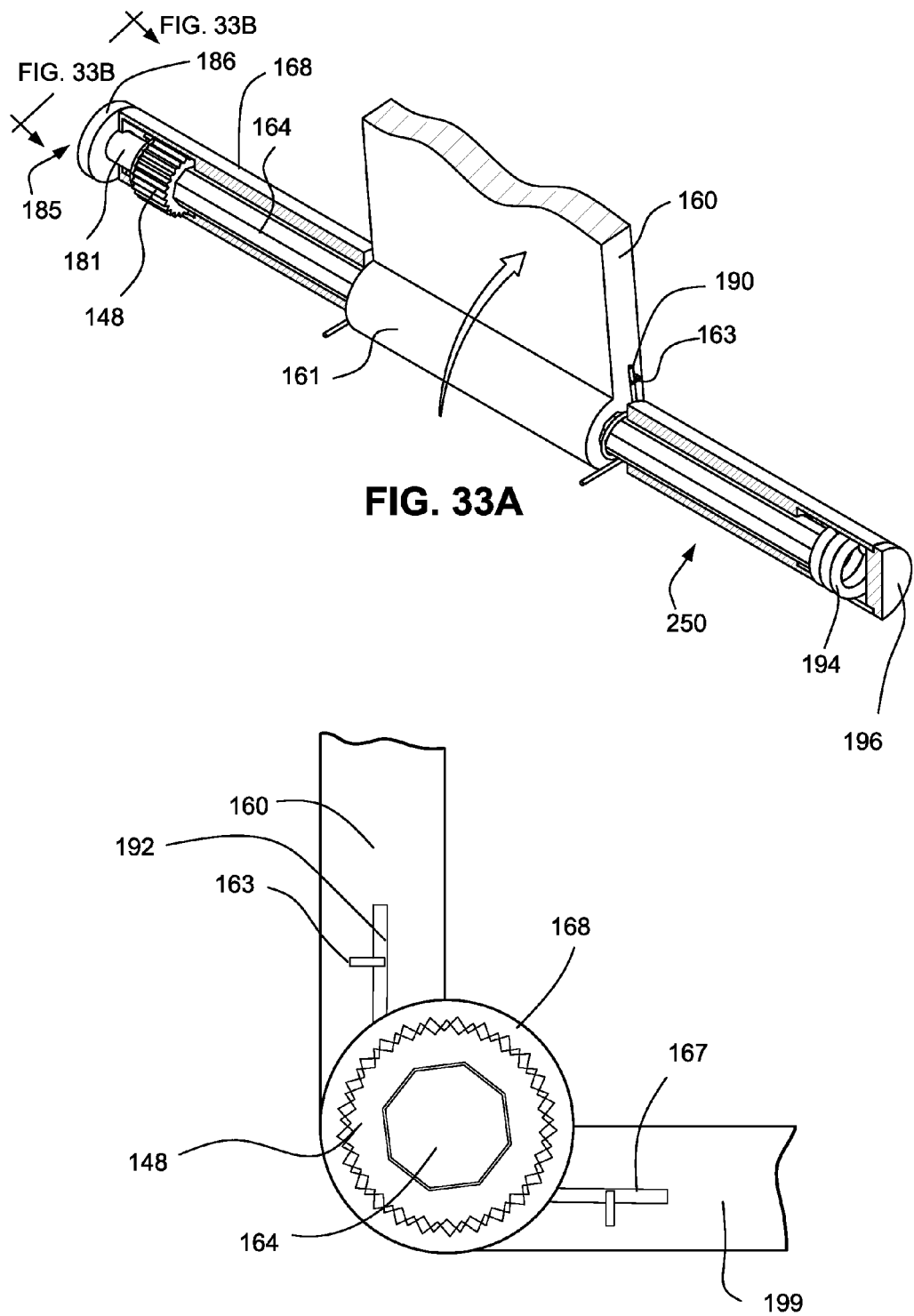
Figure 34A:
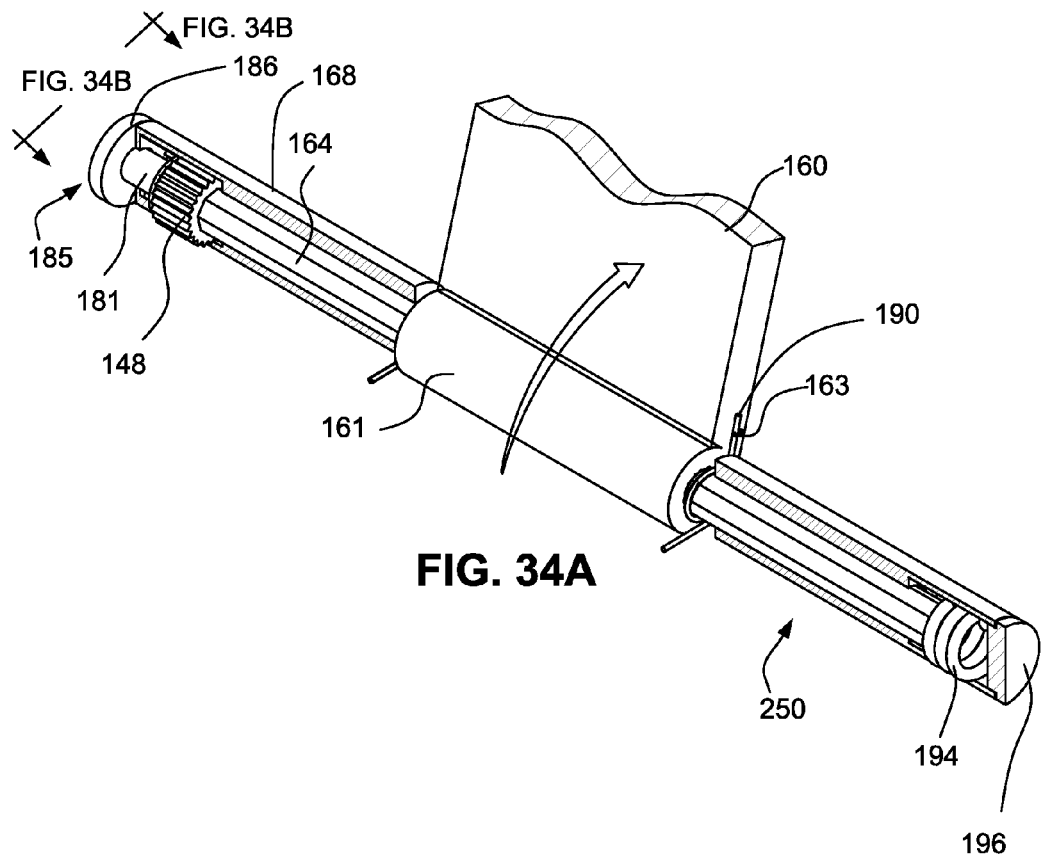
Figure 34B:
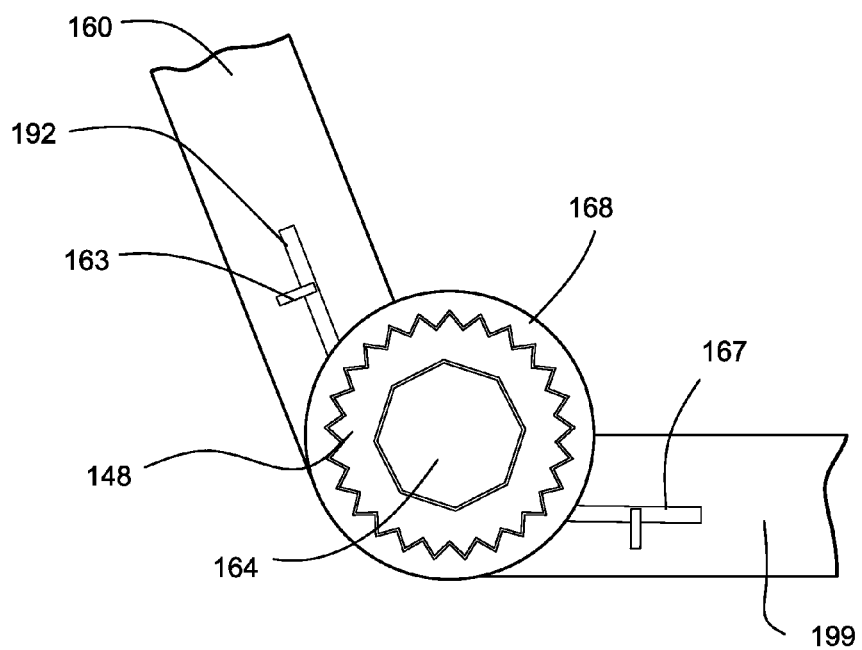
Figure 35A:
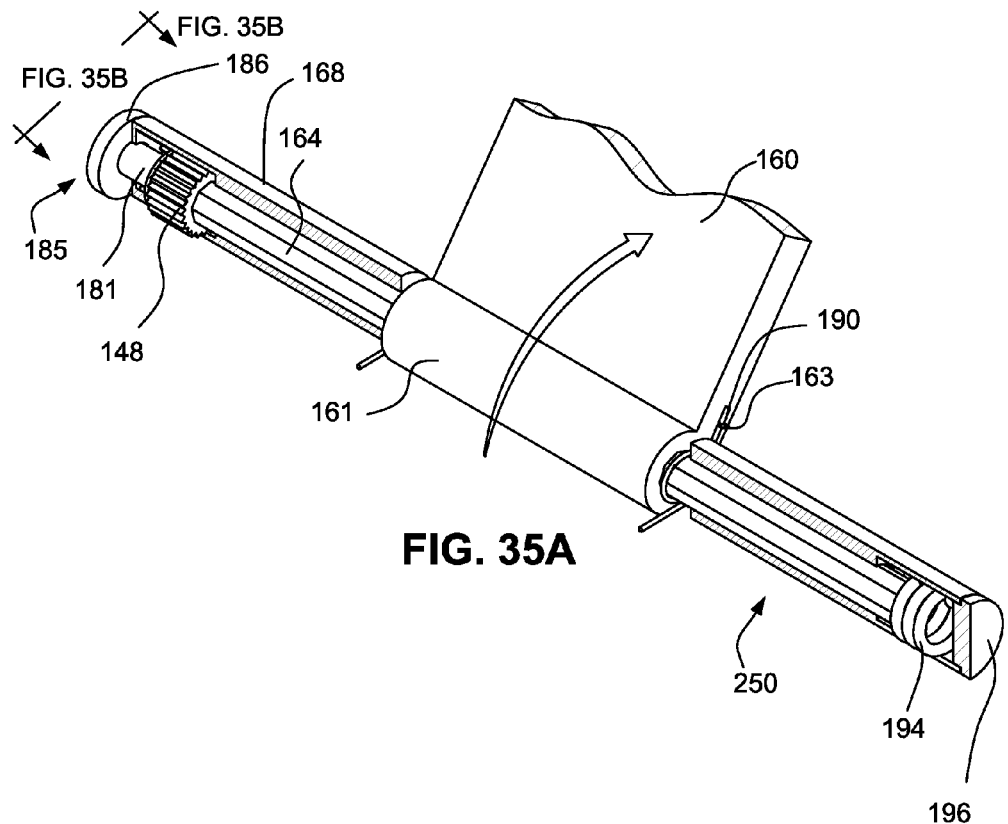
Figure 35B:
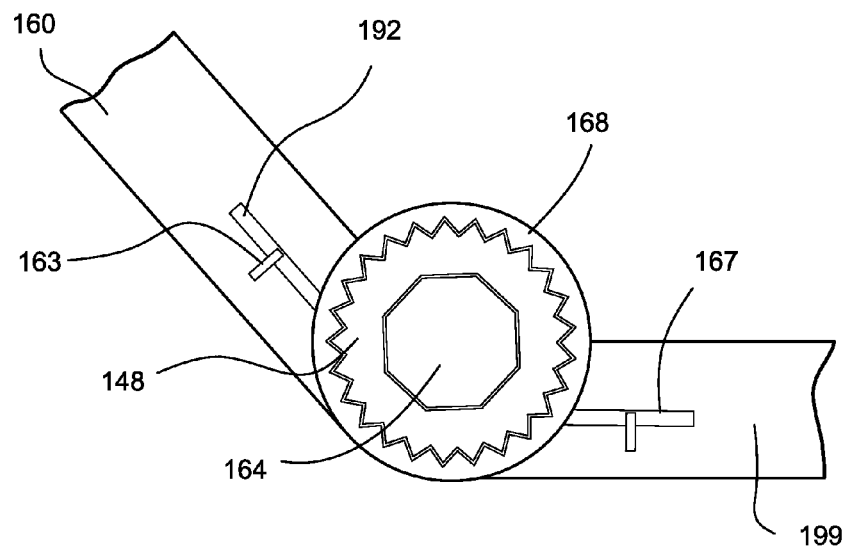

FIGS. 32A/32B, 33A/33B, 34A/34B and 35A/35B show the example non-limiting structure in a different view as the hinge 161 continues to rotate with button 185 remaining depressed. Thus, FIGS. 32A, 33A, and 34A and 35A show the new angular position of center plate 160 after it has been pushed back while button 185 was pressed and spur gear 148 was disengaged from internal gear 152. As discussed above, default angular position of the rotation lock mechanism 250 can be set by spring 190 fastened to pin fastener 163 and 167 so that if the user simply releases the structure while continuing to depress button 185, the structure will assume this default position.

Figure 36A:
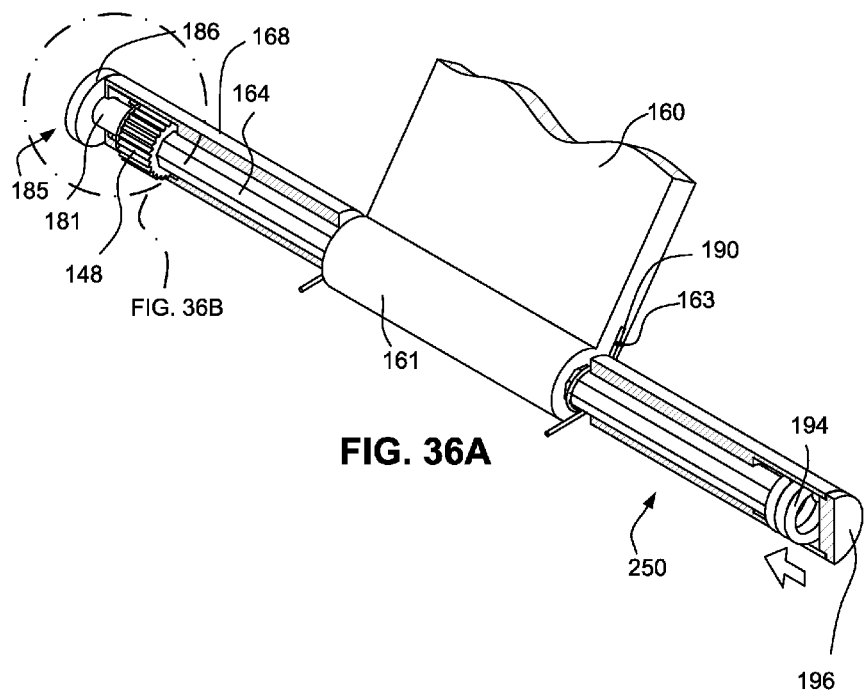
Figure 36B:
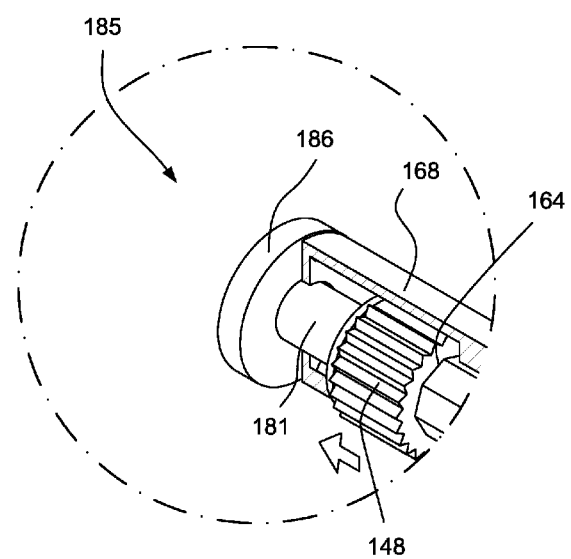
Figure 37A:
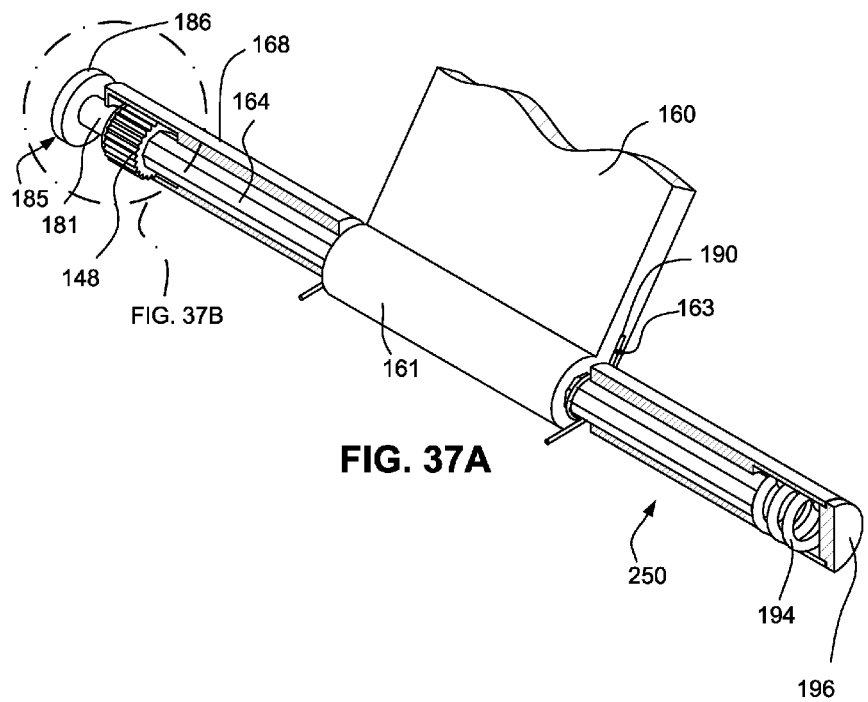
Figure 37B:
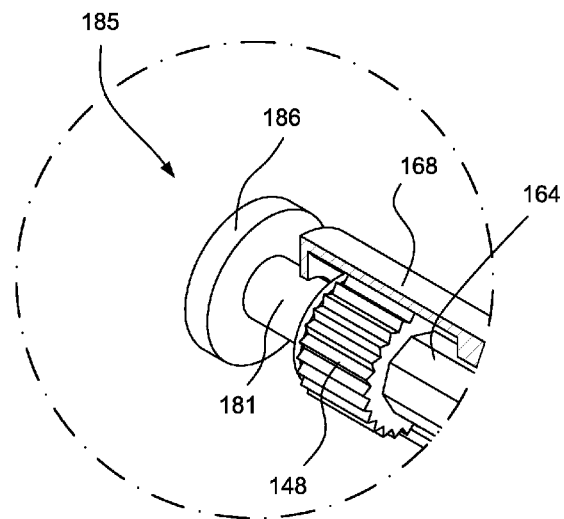
Figure 38A:
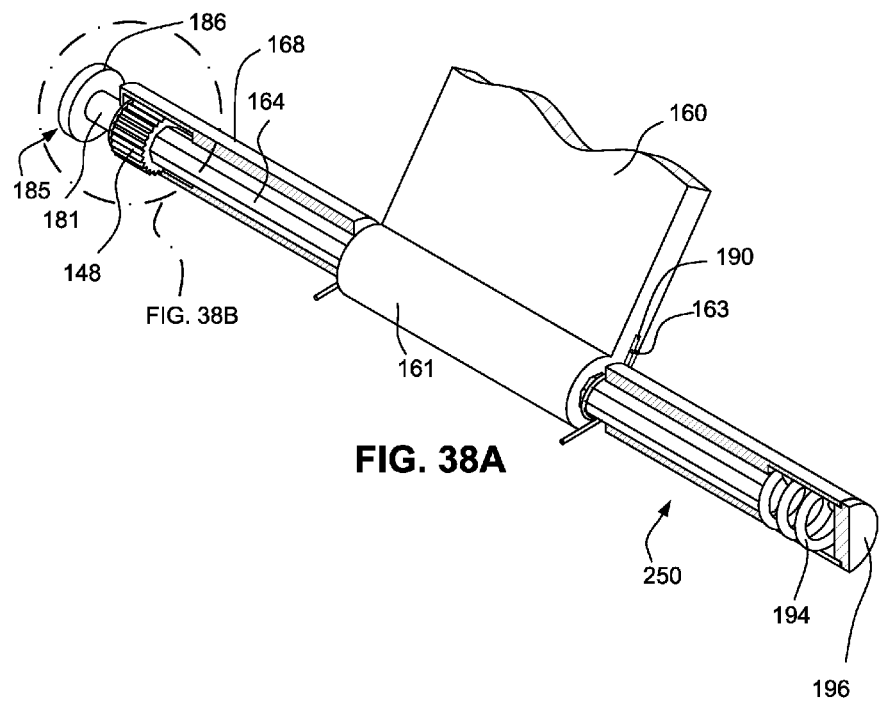
Figure 38B:
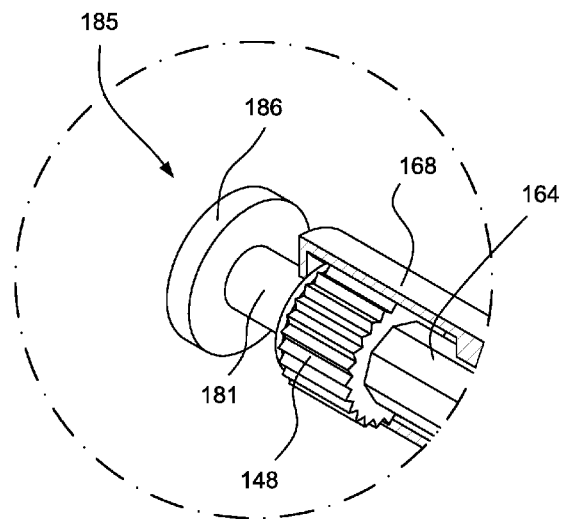

Once the user rotates the structure to the desired orientation, the user may release the button 185 to lock the structure in the new desired orientation. FIGS. 36A/36B, 37A/37B, 38A/38B and 39A/39B show spring 194 acting against the temporarily-displaced shaft 164 to cause spur gear 148 to reengage internal gear 152 and thereby lock the rotational position of hinge 161. The hinge once locked can withstand and resist further rotating under at least typical maximum force pressure (e.g., at least 50 Newtons for men and 40 Newtons for women) humans can apply by poking or pressing a touch screen surface with their finger or by pressing or writing with a stylus (typically at least 85-100 grams). See e.g., Astin, "Finger force capability: measurement and prediction using anthropometric and myoelectric measures" (MSISE Virginia Tech 1999); and Schomaker et al., "The Relation between Pen Force and Pen Point Kinematics in Handwriting," Biological Cybernetics 63:277-285 (1990), both incorporated herein by reference.

Figure 39A:
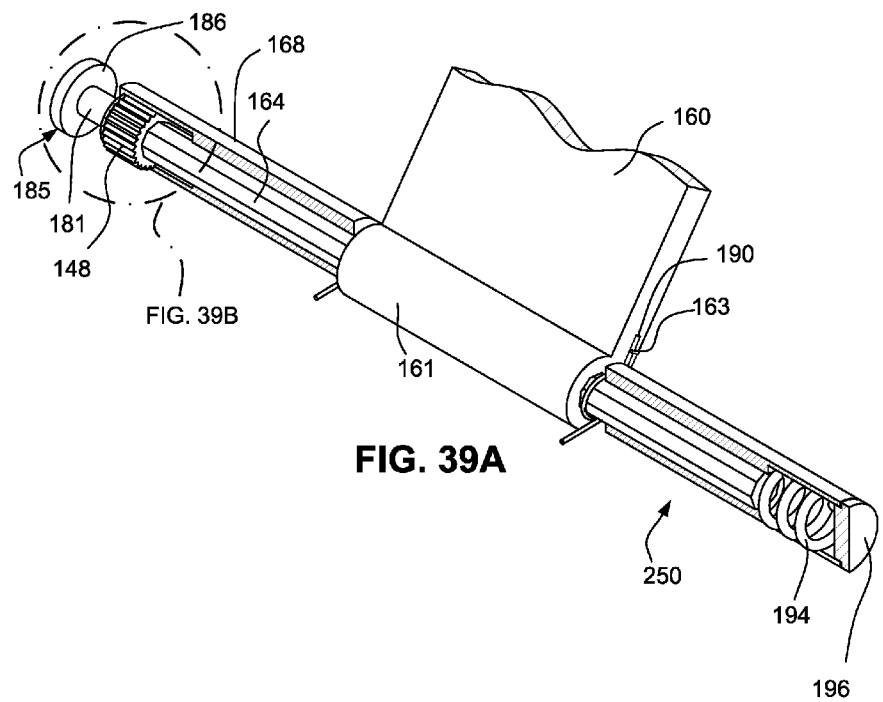
Figure 39B:
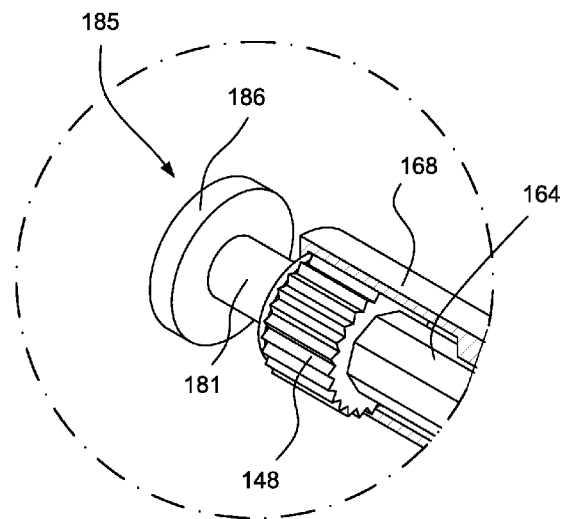

FIG. 39A and the 39B show the new fixed angular position of hinge plate 160 after push-button 185 was released and the spring 194 pushed the spur gear 148 into the internal gear 152 in chamber 146 of hinge cylinder 168.

Figure 40:
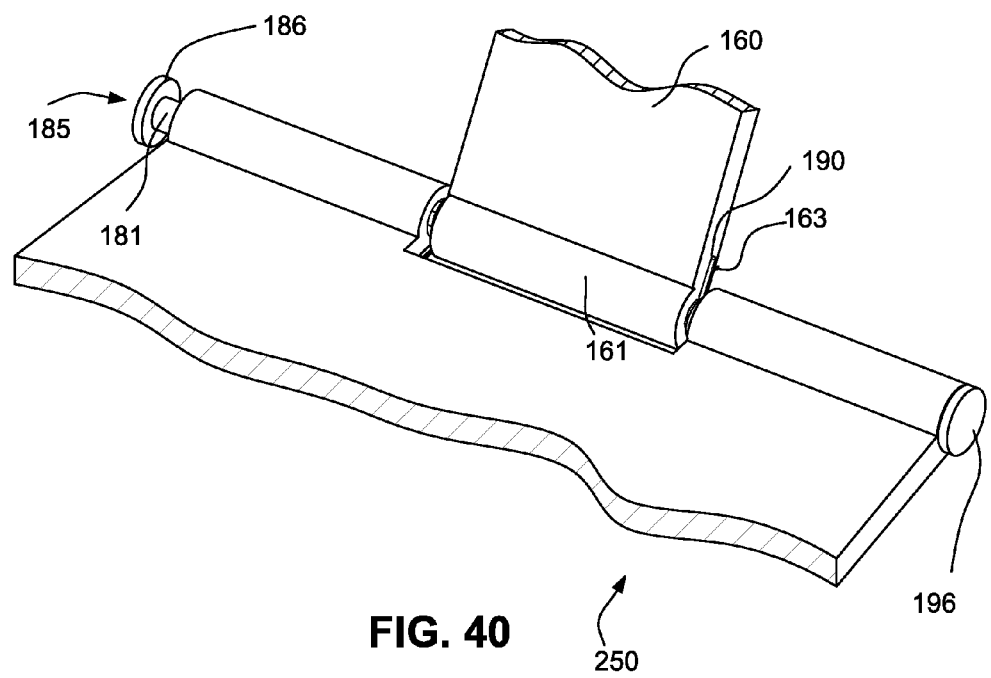
FIG. 40 illustrates an example partial cross-sectional perspective three-dimensional representation of a rotation lock mechanism in the "locked" position (after the angular position of the mid-section had been adjusted and the button had been released) with the hinge's mid-section in the new backward leaning position.

FIG. 40 shows a 3D representation of the new fixed angular position of the center hinge plate 160 of hinge 250.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

I claim:

1. A hinge or clamp assembly comprising:
    a first plate or arm including a slot and outer cylindrical bores on opposite sides of the slot, wherein the outer cylindrical bores are coaxial;
        a second plate or arm seated in the slot of the first plate or arm and the second plate or arm comprising a faceted, ridged or toothed middle cylindrical bore coaxial with the outer cylindrical bores, wherein the middle cylindrical bore has a first end facing an end of one of the outer cylindrical bores and an opposite end facing another end of the outer cylindrical bores such that the middle cylindrical bore does not extend into the outer cylindrical bores, and wherein the second plate or arm moves rotationally relative to the first plate or arm about a longitudinal axis defined by the outer and middle cylindrical bores;
        a locking mechanism including a hinge shaft that is configured to move axially along the longitudinal axis of the middle and outer cylindrical bores, and having at least one first locking region with faceted, ridged or toothed sides on an outer circumference of the shaft, wherein the faceted, ridged or toothed locking sides key into the faceted, ridged or toothed middle cylindrical bore of the second plate or arm, and wherein the hinge shaft is shorter in length than the combined length of the outer and middle cylindrical bores, is seated inside the outer and middle cylindrical bores, extends through the outer and middle cylindrical bores, and moves axially along the longitudinal axis of the outer and middle cylindrical bores;

at least one chamber coaxial with and receiving the shaft located within one of the outer cylindrical bores wherein the at least one chamber includes a non-locking region and a second locking region adjacent to the non-locking region along the direction of the longitudinal axis of the bore, wherein the non-locking region includes a smooth internal cylindrical wall and the second locking region includes an internal wall with faceted, ridged or toothed internal surfaces that are configured to receive and interlock with faceted sides, ridges, or teeth of the at least one first locking region on an outer circumference of the shaft;

wherein the hinge shaft has an unlocked position where the at least one first locking region of the hinge shaft is positioned entirely inside the non-locking region of the at least one chamber that is located inside one of the outer cylindrical bores, and wherein, while the hinge shaft is in the unlocked position, the middle cylindrical bore and the second plate or arm are free to rotate relative to the outer cylindrical bores and the first plate or arm, and wherein the hinge shaft has a locked position where the at least one first locking region of the hinge shaft is partially or fully positioned inside the second locking region of the at least one chamber that is located inside one of the outer cylindrical bores and, while the hinge shaft is in the locked position, the middle cylindrical bore and the second plate or arm are prevented by the hinge shaft from rotating relative to the outer cylindrical bores and the first plate or arm, and a biasing mechanism configured to urge the shaft axially along the longitudinal axis of the bores in a direction to engage the first and the second locking regions thereby preventing the first plate or arm and the second plate or arm from pivoting relative to one another; and a release post configured to be manually displaced to urge the shaft axially along the longitudinal axis of the bores in a direction to disengage the first and second locking regions, thereby allowing the second plate or arm to pivot relative to the first plate or arm.

2. The hinge or clamp of claim 1, further comprising another biasing mechanism configured to urge the first plate or arm and the second plate or arm away from each other.

3. The hinge or clamp of claim 2, wherein the another biasing mechanism is a spring.

4. The hinge or clamp of claim 3, wherein the another biasing mechanism is a coil spring.

5. The hinge or clamp of claim 1 wherein the cylinder included with the first plate or arm is a plurality of cylinders.

6. The hinge or clamp of claim 1 wherein the cylinder included with the second plate or arm is a plurality of cylinders.

7. The hinge or clamp of claim 6 wherein the cylinder included with the first plate or arm is a plurality of cylinders.

8. The hinge or clamp of claim 1 wherein the locking region includes a locking segment fixed to the shaft.

* * * * *